(12) United States Patent
Eyer et al.

(10) Patent No.: US 6,588,015 B1
(45) Date of Patent: Jul. 1, 2003

(54) BROADCAST INTERACTIVE DIGITAL RADIO

(75) Inventors: Mark K. Eyer, San Diego, CA (US); G. Kent Walker, Escondido, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/007,295

(22) Filed: Jan. 14, 1998

(51) Int. Cl.$^7$ .............................. H04N 5/76; H04N 7/14; H04L 5/00

(52) U.S. Cl. .................... 725/89; 725/134; 725/142; 704/500

(58) Field of Search .................. 348/7; 725/135–142, 725/86–103, 114–117, 131–153; 704/500–504

(56) References Cited

U.S. PATENT DOCUMENTS

| | | | | |
|---|---|---|---|---|
| 4,602,279 A | * | 7/1986 | Freeman ..................... 725/35 |
| 4,974,085 A | * | 11/1990 | Campbell et al. ........... 348/460 |
| 5,278,826 A | | 1/1994 | Murphy et al. |
| 5,357,276 A | * | 10/1994 | Banker et al. .............. 725/102 |
| 5,365,552 A | * | 11/1994 | Astle ......................... 375/106 |
| 5,442,390 A | * | 8/1995 | Hooper et al. ................ 725/90 |
| 5,521,943 A | | 5/1996 | Dambacher |
| 5,532,735 A | * | 7/1996 | Blahut et al. ................. 725/32 |
| 5,572,442 A | | 11/1996 | Schulhof et al. |
| 5,581,576 A | | 12/1996 | Lanzetta et al. |
| 5,648,967 A | | 7/1997 | Schulz |
| 5,696,869 A | * | 12/1997 | Abecassis ..................... 386/52 |
| 5,712,992 A | | 1/1998 | Hawkins et al. |
| 5,727,141 A | * | 3/1998 | Hoddie et al. .............. 345/427 |
| 5,754,773 A | | 5/1998 | Ozden et al. |
| 5,808,662 A | * | 9/1998 | Kinney et al. ................ 725/89 |
| 5,818,441 A | * | 10/1998 | Throckmorton et al. .... 725/110 |
| 5,953,350 A | * | 9/1999 | Higgins ....................... 370/524 |
| 5,956,488 A | * | 9/1999 | Suzuki ........................ 709/219 |
| 5,987,210 A | * | 11/1999 | Iggulden et al. ............... 386/46 |
| 5,996,022 A | * | 11/1999 | Krueger et al. ............. 709/247 |
| 6,005,561 A | * | 12/1999 | Hawkins et al. ............ 725/105 |
| 6,014,706 A | * | 1/2000 | Cannon et al. ............... 725/89 |
| 6,434,748 B1 | * | 8/2002 | Shen et al. ................... 725/89 |

FOREIGN PATENT DOCUMENTS

| EP | 0 758 833 A2 | 2/1997 |
| EP | 0 797 355 A2 | 9/1997 |

* cited by examiner

*Primary Examiner*—Andrew Faile
*Assistant Examiner*—Reuben M. Brown
(74) *Attorney, Agent, or Firm*—Barry R. Lipsitz; Douglas M. McAllister

(57) ABSTRACT

A digital radio broadcast system provides various interactive features, including skip forward and skip backward. In one embodiment, data is transmitted at a faster than real time rate and accumulated in a buffer at a receiver. The user can play a current track or skip to subsequent or earlier tracks. In another embodiment, two or more programming service streams (i.e., user channels) are communicated such that a user can move directly from a current track to the beginning of a track of another stream. In another embodiment, tiers of service levels are provided so that paying subscribers can bypass some or all of the commercial messages, while non-paying subscribers can not bypass the commercials. Replacement programming may be transmitted in a portion of the bandwidth of the free service. At a receiver, control data may be used with multimedia data to provide a multimedia clip which identifies features of a track, such as artist, song title or lyrics. Identifying data may be communicated with the tracks to allow a user to skip disliked tracks or recover favorite tracks on another programming service stream.

42 Claims, 11 Drawing Sheets

FIG. 11

BROADCAST INTERACTIVE DIGITAL RADIO

BACKGROUND OF THE INVENTION

The present invention relates to an apparatus and method for providing a broadcast digital radio service in which the user is afforded various interactive features.

Various digital communication protocols have been developed for communicating audio and other data in a packetized data stream. For example, digital audio streams which conform to the ISO/IEC International Standard 13818-1, Musicam, and Dolby AC-2 and AC-3 formats are known. ISO/IEC 13818-1, also published as ITU-T Recommendation H.222.0, is compatible with the MPEG-2 video standard described in ITU-T Rec. H.262, or ISO/IEC 13818-2 and 13818-3. These schemes can provide for the communication of compressed audio data over various broadcast channels, including satellite, cable television, or terrestrial networks, for example. Other digital formats are known for the communication of video and other types of data.

However, such schemes are not designed to enable the user to interact with the data. For example, in an audio context it has not been possible to manipulate received audio data to provide features which are normally associated with a compact disc (CD) player. Such features include skipping a track in forward or reverse, pausing the audio output, fast forward or reverse, or repeating an audio selection from the beginning of a track. Similarly, with analog radio broadcasts, the user has no control over the received data other than changing the channel. Thus, the user has been forced to obtain pre-recorded media such as compact discs or magnetic tape in order to enjoy such features.

Accordingly, it would be desirable to provide a digital radio broadcast system which affords the user various interactive features. The system should take advantage of digital technology such as packet delivery of multiple concurrent data streams, and digital storage and control.

It would also be desirable to provide an audio receiver/player which gives the user information about the selection currently playing, such as a textual display which provides the name, performer, album, lyrics or time/duration of the selection, or even a verbal (e.g., vocal) description.

The system should be configurable in various tiers, for example, as an access-controlled, commercial-free service, or as a free service which includes commercials.

The system should be compatible with audio data as well as video and multimedia data.

The system should be compatible with existing and proposed governmental regulations and commercial standards regarding terrestrial channel allocations.

The present invention provides a system having the above and other advantages.

SUMMARY OF THE INVENTION

In accordance with the present invention, a digital radio broadcast system provides various interactive features, including skip forward and skip backward. In one embodiment, data is transmitted at a faster than real time rate and accumulated in a buffer at a receiver. The data rate may reduced, at least temporarily, to the real-time rate. The user can play a current track or skip to subsequent or earlier tracks.

In another embodiment, two or more channels of programming are communicated such that a user can move directly from a current track to the beginning of a track on another channel. The channels may be transmitted at real time or faster than real time. In another embodiment, tiers of service levels are provided so that a paying subscriber can bypass some or all of the commercial messages, while non-paying users may not bypass the commercials. Replacement programming for use in overriding commercials (e.g., for paying customers) may be transmitted in one or more portions of available bandwidth. At a receiver, control data may provide identification of a track, such as artist, song title, or the like.

In particular, a method for broadcasting digital programming services includes the steps of packetizing a plurality of program segments for transport in at least one data stream, transmitting the packetized program segments at an overall data rate which is greater than a play rate of the program services, temporarily storing at least a portion of the program segments in a buffer, and deleting at least one program segment in the buffer when a buffer fullness level is reached.

The packetized program segments may be transmitted in only one data stream at a rate which is greater than a play rate of the programming services.

Data may also be transmitted which designates access points for the program segments to allow a user to skip forward or backward to a program segment which is stored in the buffer while playing current program segments.

The buffer contents must be managed to avoid an overflow. This can be achieved by deleting the oldest program segment which is stored in the buffer when the buffer fullness level is reached.

Additionally, control data may be transmitted with the program segments to provide information regarding the contents of the program segments such as song title, artist, lyrics, etc.

The scheme is particularly suitable for use with audio data, although the inventive concept can be extended to video and multimedia data. The term "multimedia" is used herein to indicate audio and/or video data. Currently, the required memory size for video and multimedia is believed to be prohibitive, but this is expected to change as memory costs continue to decline and improvements in data compression are achieved.

For marketing purposes, it is desirable to provide a plurality of service tiers, e.g., a free or basic service level, and one or more premium (subscriber) levels. For example, a free service level would have a number of commercials for each hour of music or other programming, while a mid level premium service has fewer commercials, and a high level premium service has no commercials. This can be achieved by providing only the paying customers with data which indicates access points for the program segments. The access points allow a user to skip forward or backward to a program segment which is stored in the buffer after the user has begun to play a current program segment. In this manner, some users can skip over at least some of the commercial segments, while others cannot skip over the commercial segments. Moreover, for the mid and high levels, the commercials may be skipped automatically or at the user's discretion.

Instead of transmitting only one programming service in only one channel, the packetized program segments may be transported in a plurality of data streams. For example, program segments which provide jazz music may be provided in a first data stream, while program segments which provide classical music may be provided in a second data stream, and so forth. The term "programming service stream" is used herein to designate a data stream which carries data from a particular programming service. A programming service stream is analogous to a "channel" of a conventional analog radio broadcast but need not be transmitted in a separate physical channel or spectrum.

Data can be provided which indicates access points for the program segments of the first and second programming service streams to allow a user to skip directly from a currently playing program segment on the first programming service stream to a starting point of a program segment in the second programming service stream. Thus, whenever the user changes data streams, the start of a segment may be played. This is in contrast to conventional radio systems, where the user generally misses the beginning of an audio selection being played when changing the channel, and cannot recover any portion of the selection that has already passed.

When the program segments include non-commercial segments and commercial segments, the non-commercial program segments can be transmitted as replacement programming in a replacement programming bandwidth of the transmitted data stream. The replacement program is gradually accumulated over time so that the premium subscriber can recover the replacement programming while the non-paying user recovers the commercial segments. The replacement programming replaces time which would have been occupied by the commercials. The total amount of programming for the users at each service tier can therefore be the same.

Corresponding apparatus are also presented.

BRIEF DESCRIPTION OF THE DRAWINGS

FIG. 11 is an illustration of a replacement programming bandwidth and a free service bandwidth in accordance with the present invention.

DETAILED DESCRIPTION OF THE INVENTION

Figure 1:
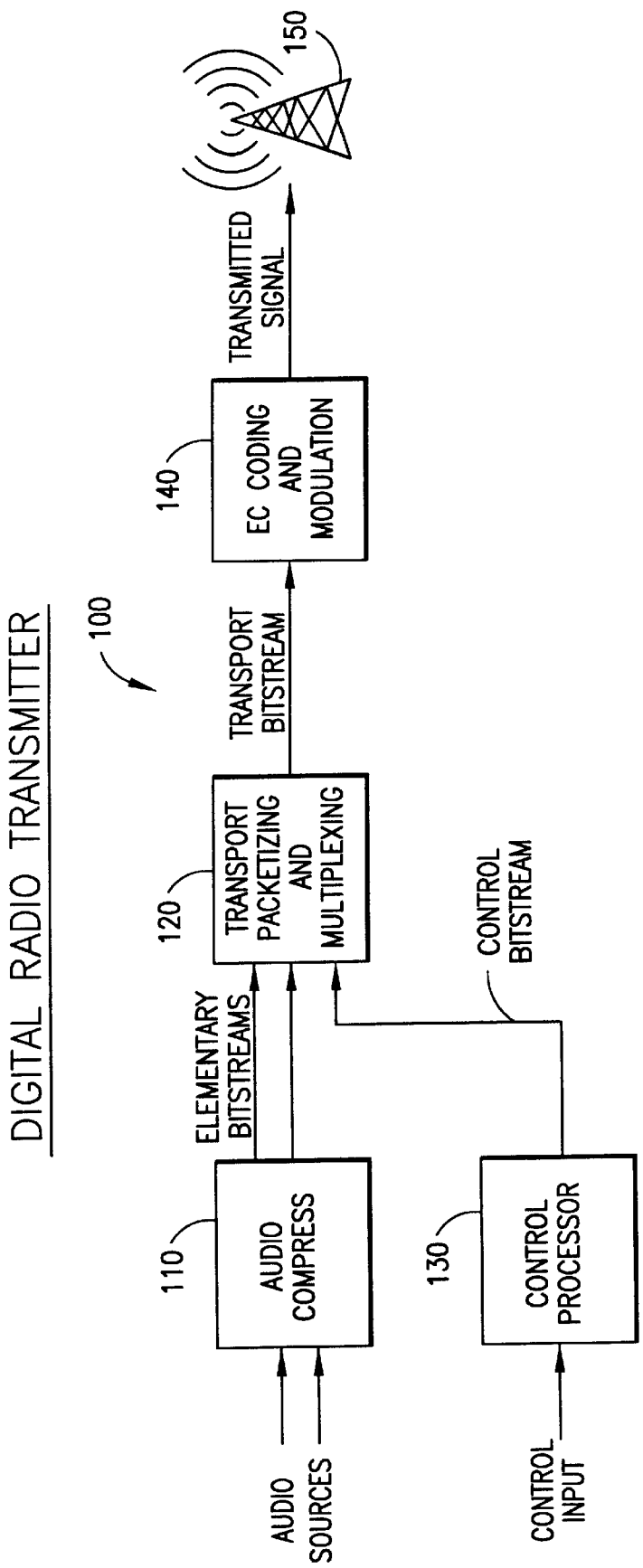
FIG. 1 is an illustration of a digital radio transmitter in accordance with the present invention.

In accordance with the present invention, an apparatus and method are presented for providing a broadcast digital radio service in which the user is afforded various interactive features.

In a first embodiment, a single programming service stream is transmitted faster than the play rate of the audio (e.g., faster than real time). Rate buffering in the receiver is used to create an output at the correct playback rate. Unless the user takes action, the buffer eventually fills. When near-full, the receiver deletes one full audio selection (e.g., a complete song) in the buffer, effectively skipping a selection automatically. The user may take action to skip a full selection or to move through the buffer contents all the way to the point that it becomes empty.

This scheme relies on the presence of a separate control stream that provides the receiver with the timing information necessary to know where one selection ends and another begins (e.g., access points). It is possible to access-control the control stream by encrypting it, thereby making it available only to paying subscribers. When this is done, only paying subscribers can correctly play the music or other audio sequence without interrupting selections at random times. Moreover, the audio itself can be encrypted to keep any non-subscriber from hearing anything.

In one embodiment, a digitally delivered premium radio service is defined to include one programming service stream of audio program selections running at a faster-than-real time rate and one control stream that identifies the composition of the service and the packet identifiers (PIDs) carrying its component parts, and provides begin/end timing for each audio track. Optionally, the radio service can include one stream that identifies (vocally) the artist, selection, album, or other information and/or one stream that identifies (textually or via graphic images) information about the selection (artist, selection, lyrics, etc.). All of these data streams can be multiplexed together and modulated onto a radio frequency (RF) carrier in a conventional manner.

The digital receiver has functional components including a tuner/demodulator to convert a received RF signal into a digital bitstream, a de-interleaver and forward error corrector to repair digital bit errors induced by noise on the channel, a transport synchronization processor to recover transport packets from the bitstream, a PID filter to separate packets with the desired packet ID from the transport multiplex, RAM buffers for intermediate storage of packets, large RAM buffers used to hold time-shifted audio data, a RAM buffer to hold program ID data, a packet decryption processor, and an audio decompression processor. A control CPU is also provided to control tuning, acquisition of the digital stream, front panel controls, data pointers to RAM, data routing to the decompression processor, and conventional features such as volume, bass and treble.

Since the delivery of audio data is designed to exceed the playback rate, the receiver's buffer eventually fills. To prevent a buffer overflow, the control processor resets the buffer's output queue pointer to skip a full selection (e.g., track), thus restoring space for new input. One of the functions of the control stream is to identify the begin/end points for audio selections.

In a second embodiment, multiple real time streams are provided such that the transmitted and received data rate is the same as the play rate. Two or more concurrent real time audio program streams are broadcast. A receiver monitors and buffers two or more streams concurrently, buffering audio selections in order to support selection skipping, fast forward/reverse, and pause functions.

In both embodiments, an optional extra buffer is used to collect selection ID audio clips, which are verbal descriptions of audio tracks. This buffer or another can be used to collect textual information relating to each selection as well, including performer name, group name, selection title, album information, lyrics, etc. Generally, a multimedia clip which includes audio and video may be provided. For the case of several audio programming service streams, each stream may be delivered at the playback rate (as in MPEG-2). Switching between the two buffers is timed according to information on audio track start/end times that is obtained from the control stream which, as indicated above, may be encrypted With either embodiment, the total transmitted data rate (e.g., taking one or more streams into account) is greater than the playback rate, at least on average.

FIG. 1 is an illustration of a digital radio transmitter in accordance with the present invention. The transmitter is shown generally at 100. An audio compression function 110 receives and compresses different audio sources such as musical programming, news features, or other programming which is currently available with conventional analog radio systems. The invention is believed to be particularly suitable for musical programming, where successive discrete tracks are transmitted.

Any known audio compression scheme may be used, such as the MPEG ISO/IEC 13818-1 and -3, Musicam, or Dolby AC-2 and AC-3 formats. Typically, several audio sources are provided from which the user can choose.

The compressed audio sources are output from the audio compression function 110 as elementary bitstreams and provided to a transport packetizing and multiplexing function 120, where they are assembled into a transport bitstream. For the first embodiment of the invention, the transport bitstream comprises a single programming service stream of the audio sources at a faster than real time rate. For the second embodiment of the invention, multiple concurrent programming service streams at a real time rate are provided. Alternatively, multiple concurrent streams at a faster than real time rate may be provided.

The transport bitstream includes packetized elementary stream (PES) packets such as described in ISO/IEC 13818-1. Each transport packet is identified by a packet identifier (PID). Error control (EC) coding and modulation is performed at a function 140 to provide a transmitted signal to a transmitting antenna 150. Error control coding, such as forward error control coding, is optional, but is generally necessary for practical implementations.

Although a transmitting antenna is shown for a terrestrial broadcast in the illustration, it will be appreciated that the invention may be adapted for use with other communication media, including satellite, cable television, telephone and computer networks. Additionally, although audio sources are shown, the invention can be adapted for use with other types of sources as well, such as video or other data. Audio is considered to be a practical application currently relative to video because of the relatively modest amount of RAM needed to buffer an audio stream for the desired time duration.

A control processor 130 receives a control input and provides a corresponding control bitstream to the transport packetizing and multiplexing function 120 for communication in the transmitted signal.

Not shown is an optional block which applies access control (encryption) to one or more of the audio sources, and/or one or more of the control streams, and creates Entitlement Control Message streams and an Entitlement Management Message stream, according to techniques well-known in the art, such as discussed in commonly-assigned U.S. Pat. No. 5,627,892 to Kauffman.

The control input (e.g., data) can include timing information, such as the start/stop or start/duration of musical selections and commercials, selection name, artist, album, concert information, band member names, album producer, lyrics, recording date, album release date, album sales information, or any other information which is related to the selection.

Figure 2:
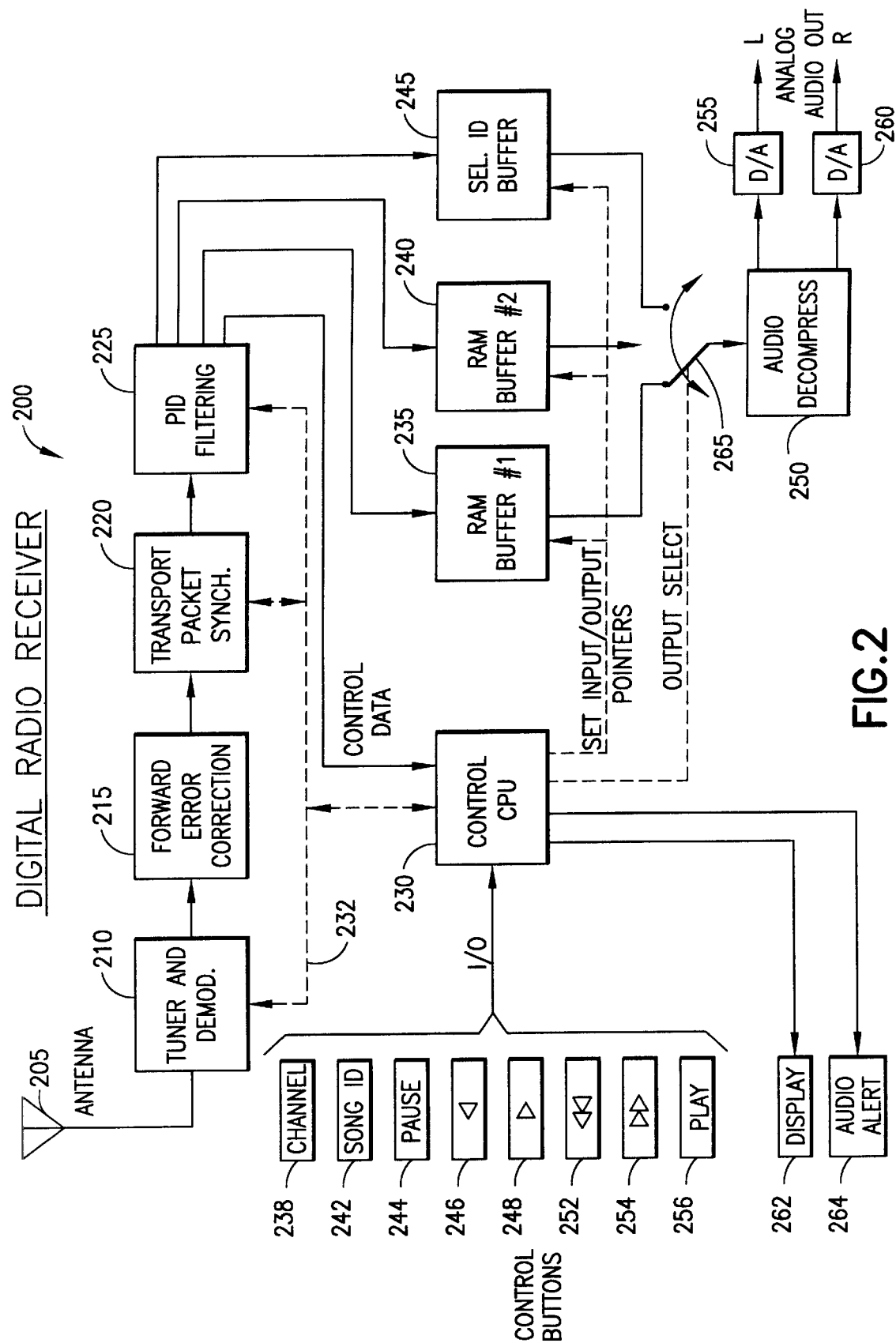
FIG. 2 is an illustration of a digital radio receiver in accordance with the present invention.

FIG. 2 is an illustration of a digital radio receiver in accordance with the present invention. The receiver is shown generally at 200. A receiving antenna 205 receives the transmitted RF signal and provides it to a tuner and demodulator 210, which converts the RF signal into a digital bitstream. The demodulated signal is processed at a forward error correction function 215 to repair digital bit errors induced by noise on the channel. A deinterleaver may also be used. A transport packet synchronization function 220 recovers transport packets from the bitstream.

A PID filtering function 225 separates the audio sources from the transport multiplex according to PIDs which are associated with the respective audio sources, and provides the audio sources to respective buffers 235 and 240 for temporary storage. The buffers need not be discrete elements but can be portions of a larger memory space. Additionally, more than two buffers may be provided. The buffers may be implemented as random access memory (RAM). The audio sources generally will comprise a number of successive tracks such as musical selections, and optionally, advertising or other filler material.

Control data such as the start/stop or start/duration of musical selections and commercials is provided from the PID filtering function 225 to a control central processing unit (CPU) 230, which includes operating software in associated read-only memory (ROM), not shown. The CPU 230 controls tuning, acquisition of the data stream, user control buttons which may be on a panel of the receiver, data pointers to memory, and data routing to a decompression processor. The CPU 230 also controls conventional functions such as volume, bass and treble, for example.

Data such as the selection name or artist is provided from the PID filtering function 225 to a selection ID buffer 245. This data can provide a verbal (i.e., vocal) or multimedia description of the associated audio tracks stored in the buffers 235 and 245. The user may provide a SONG ID command, which retrieves the selection ID data, decompresses it, and provides it to a speaker as an audio clip. For example, the selection ID may provide a brief description of the author, year, and sales history of a particular musical track.

The control CPU 230 can control and communicate with the tuner and demodulator 210, transport packet synchronization function 220, and PID filtering function via a line 232. The CPU 230 also sets input/output pointers (e.g., access points) for the audio tracks in buffers 235 and 240, and for the multimedia clip data in buffer 245. As described in greater detail in connection with FIG. 10, access points can be varied to provided different tiers of service. For example, subscribers who pay a fee may have the ability to skip commercials if they desire, or the commercials may be skipped automatically. Non-paying users will not have the ability to skip commercials.

The CPU 230 also provides an output select signal to a switch 265 to select the output from the buffer 235, buffer 240, or buffer 245. The output data is processed by an audio decompress function 250 and provided to digital-to-analog (D/A) converters 255 and 260 to provide left and right channel audio signals, respectively.

The CPU 230 also receives commands from control buttons or the like which can be activated by the user. For example, a CHANNEL button 238 causes the CPU 230 to select another audio track from the next programming service stream, e.g., a programming service stream with a channel number which is above or below the channel number of the current programming service stream. Each programming service stream may be assigned a "channel" number or other indicator for this purpose. For example, each programming service stream can be identified by a letter which is based on a "station identifier", e.g., "C" for "CBS", or the type of programming service provided, e.g., "J" for jazz music, and "C" for classical music, or some other scheme. Recall that the programming service streams need not be on separate physical transmission channels. Alternatively, the button 238 could be termed a PROGRAMMING SERVICE STREAM button. The channel button 238 may have an "up" and a "down" position. Alternatively, or additionally, a key pad may be provided to allow the user to directly tune to a specific channel. Other control interfaces such as voice control may be used.

A SONG ID button 242 causes the CPU 230 to recover the identification of the audio selection which is currently being played, and to display the identification on a text and/or graphics display 262, such as a LCD screen. Alternatively, actuation of button 242 may recover a spoken and/or visual description (e.g., multimedia clip) which is obtained from the selection ID data in buffer 245. An audio alert device 264 may provide a voice commentary or other noise such as a beep which informs or alerts the user.

A PAUSE button 244 causes the CPU 230 to halt the playing of any audio by disconnecting the switch 265. The current track which was being played when the PAUSE button 244 was pressed (e.g., START PAUSE) should be retained in memory so that when the PAUSE button is turned off (e.g., END PAUSE), the current track will continue playing.

A REVERSE button 246, shown as a single left-pointing arrowhead, actuates the CPU 230 to play previous portions of the current track. This function is also known as "rewind" in the context of conventional magnetic tape which is physically wound on spools. The amount of reverse, or backtracking, of the current track can be a function of the duration in which the button 246 is depressed, or the number of times the button is depressed and released, e.g., five seconds of reverse per press and release cycle. It is also possible to reverse beyond the current track to previous tracks, if previous tracks are present in RAM.

A FAST FORWARD button 248, shown as a single right-pointing arrowhead, has an opposite effect than the REVERSE button 246. The FAST FORWARD button 248 actuates the CPU 230 to begin playing subsequent portions of the current track. The amount of fast forwarding of the current track can be a function of the duration in which the button 248 is depressed, or the number of times the button is depressed and released, e.g., five seconds of fast forwarding per press and release cycle. It is also possible to fast forward beyond the current track to subsequent tracks, if present in RAM.

A SKIP BACKWARD button 252, shown as a double left-pointing arrowhead, actuates the CPU 230 to initiate playing of the first previous audio track at the start of that track. Alternatively, if the button 252 is held down or pressed again, the second next previous track is played, and so forth. If there is no previous track available in memory, the current track may be re-played from the start, or no action may be taken, so that the current track continues to play. In the event that an action desired by the user is unavailable, a suitable message can be locally generated by CPU 230 and displayed on display 262 and/or via the audio alert 264.

A SKIP FORWARD button 254, shown as a double right-pointing arrowhead, causes the CPU 230 to begin playing the first next audio track at the start of that track. Alternatively, if the button 254 is held down or pressed again, the second next track is played, and so forth. Generally, at least a portion of the next track will be available since the data is transmitted at faster than real time, so the SKIP FORWARD feature will always be available.

A PLAY button 256 causes the CPU 230 to play the current audio track.

The number of tracks available either before or after the current track will depend on factors such as the available buffer capacity and the particular play sequence. Specific examples of play sequences are discussed in FIGS. 4–8.

Additionally, the particular control buttons shown in FIG. 2 are examples only. For example, the FAST FORWARD button 248 and the SKIP FORWARD button 254 may be combined in a single button such that the desired function is achieved by pressing the button a specific number of times, or for a specific duration. That is, one press may provide the fast forward function, while two quick presses provide the skip forward function. The REVERSE button 246 and SKIP BACKWARD button 252 may similarly be combined. Additionally, non-button control interfaces may be provided, such as a voice recognition system. Other variations will become apparent to those skilled in the art.

Additional customized features can be provided to the user in a "learning mode" where the user can input commands indicating specific listening preferences. For example, a control button or other interface mechanism which is activated by the user may provide a signal to the control CPU 230 indicating that a particular track is a favorite or is disliked (i.e., "love it" and "hate it" buttons, respectively). Data which identifies the particular track, e.g., a track identifier, is then stored in non-volatile memory for later use. The track identifier may be communicated with the track. Subsequently, prior to playing a track, the receiver may compare the track identifier to a stored list of disliked tracks.

A disliked track which would otherwise begin playing can be automatically skipped by skipping to the next track on the current programming service stream, or to a track on another programming service stream.

Alternatively, the receiver can scan the track identifiers of the available tracks on all the programming service streams and compare them to a stored list of track identifiers of favorite tracks. If there is a match, the receiver can automatically select the favorite track as the next track to play. Control logic may be provided such that a current track is not played more than a fixed number of times in a given time interval to avoid excessive play of the favorite. Control logic may also inform the user that the favorite track is available (e.g., on another programming service stream) and prompt the user to select the track. Thus, the tracks (e.g., program segments) are selectively recovered according to the identifiers.

Figure 3:
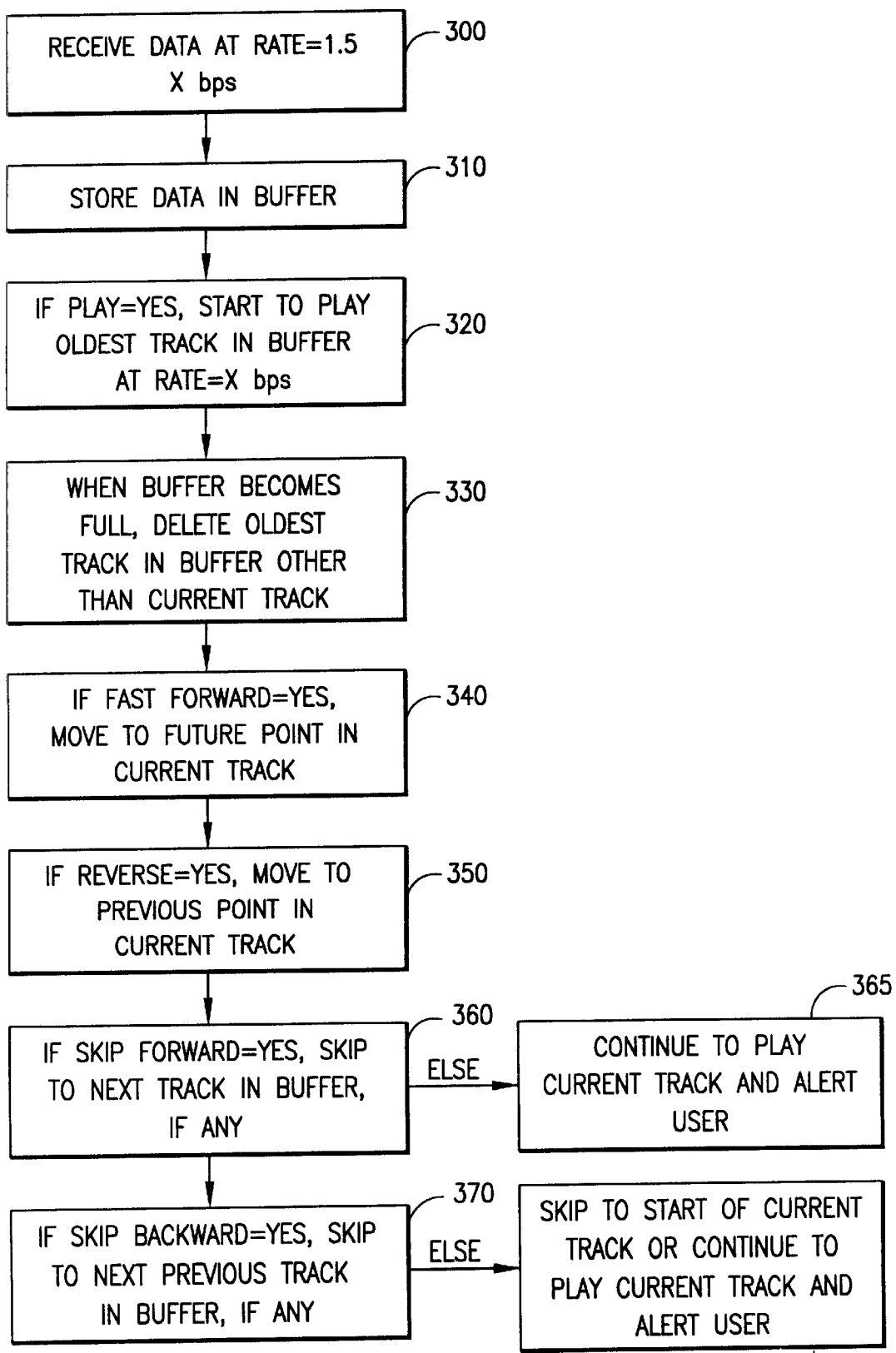
FIG. 3 is an illustration of a method in accordance with the present invention.

FIG. 3 is an illustration of a method in accordance with the present invention. It will be appreciated that FIG. 3 is a high-level process flow from which detailed control logic can be developed. Referring to block 300, the audio data is transmitted and received at a rate which is greater than the play rate. The audio can be transmitted in a single data stream at a faster than real time rate, or in multiple concurrent data streams, which have a total rate which is greater than real time. Alternatively, multiple concurrent data streams, each having a faster than real time rate may be used. For example, the transmit rate may by 1.5 times the play rate, X bits/sec (bps). 1.5 is given as an example only, as the invention encompasses any transmit rate which is greater than the real time play rate, at least on average. Additionally, the invention may be adapted for use with a variable rate scheme, where a real time transmission rate is combined with greater than real time transmission rates for the same channel or different channels. Switching from greater than real time to real time is necessary when the length of one particular selection is known to be so large that it cannot fit into any receiver's RAM.

A greater than real time reception rate allows the user to skip tracks and immediately play other tracks. If the reception rate was at real time, the user would be presented with unacceptable delays when skipping tracks, when changing channels, and/or close to system start up. The invention provides a seamless transition between tracks of a current programming service stream, or even between different programming service streams.

For example, as discussed in connection with FIG. 9, it is possible to begin playing the start of an audio track when the user changes programming service streams, e.g., from a jazz music service to a classical music service. This is possible if the tracks are buffered in parallel. This is optional since the user always has the choice of returning to the start of a track. Thus, the scheme can provide greater convenience for the user by allowing the user to listen to any track in full, even when changing programming service streams.

As shown at box 310, the received data is stored in a buffer. Buffer management is necessary since the buffers will eventually fill up. At box 320, when the user presses the PLAY button, the oldest track in the buffer will begin to play starting from the beginning. The play rate is X bps, which is less than the received data rate in one embodiment.

Referring to block 330, the buffer will eventually become filled. To make room for the new tracks which are continuing to come in, it is necessary to delete a track, or at least a portion thereof, which is currently stored. To maintain continuity for the user, the track which is currently playing or paused should not be deleted. Additionally, even if the current track is at the half way point, for instance, it may be desired for the implementation to allow the user to repeat the track. Essentially, any track other than the current track which is stored may be deleted.

For example, with the single programming service stream scheme of the first embodiment, the oldest track in the buffer may be deleted according to a first-in, first-out (FIFO) protocol. With the multiple concurrent programming service stream scheme of the second embodiment, the oldest tracks in the non-playing programming service streams can be deleted until the current track is reached, then the oldest tracks in the currently playing programming service stream can be deleted. Refer also to the discussion in connection with FIG. 9.

Referring to block 340, if the user provides a FAST FORWARD command, the system moves forward to latter portions of the current track, and then to subsequent tracks if the command continues.

Referring to block 350, if a REVERSE command is received, the system backtracks to previous portions of the current track, and then to the previous tracks if the command continues.

Referring to block 360, if a SKIP FORWARD command is received, the next track is played starting from the beginning. The beginning of each track generally corresponds to an access point, as discussed further in connection with FIG. 10. Successive next tracks may also be played if available in memory. At block 365, if no next track is available in memory, the current track continues to play and the user is alerted.

Referring to block 370, if a SKIP BACKWRD command is received, the next previous track which is stored in the buffer is played. Successive previous tracks which are available in the buffer may also be played. At block 375, if no previous tracks are available, the beginning of the current track may be played.

Processing continues as the buffer fullness level continues to be monitored. The steps shown in FIG. 3 are meant to provide a general guide only. For example, the user commands need not be monitored in any particular sequence since a new command can be processed when received. Additionally, regarding the buffer fullness level, it is possible to delete tracks according to alternative criteria, such as whether the track has been stored for a certain amount of time.

Moreover, not all of the user commands shown are required. The SKIP FORWARD and SKIP BACKWARD commands are believed to be most useful to the user since they allow the user to determine whether to listen to the current track or to another track. For example, if the user does not desire to listen to the current track, one or more future tracks can be selected without having to wait for the current track to finish. Alternatively, the user can replay a current track if so desired. The current track should be retained in memory for a few seconds after it is completed so that a replay can be obtained.

A PAUSE capability may also be provided where the current track is stored in memory for an indefinite period so that the user can listen to the remainder of it, or to replay it from the start.

The user is therefore afforded various capabilities that are not available with conventional broadcasting radio schemes.

Figure 4:
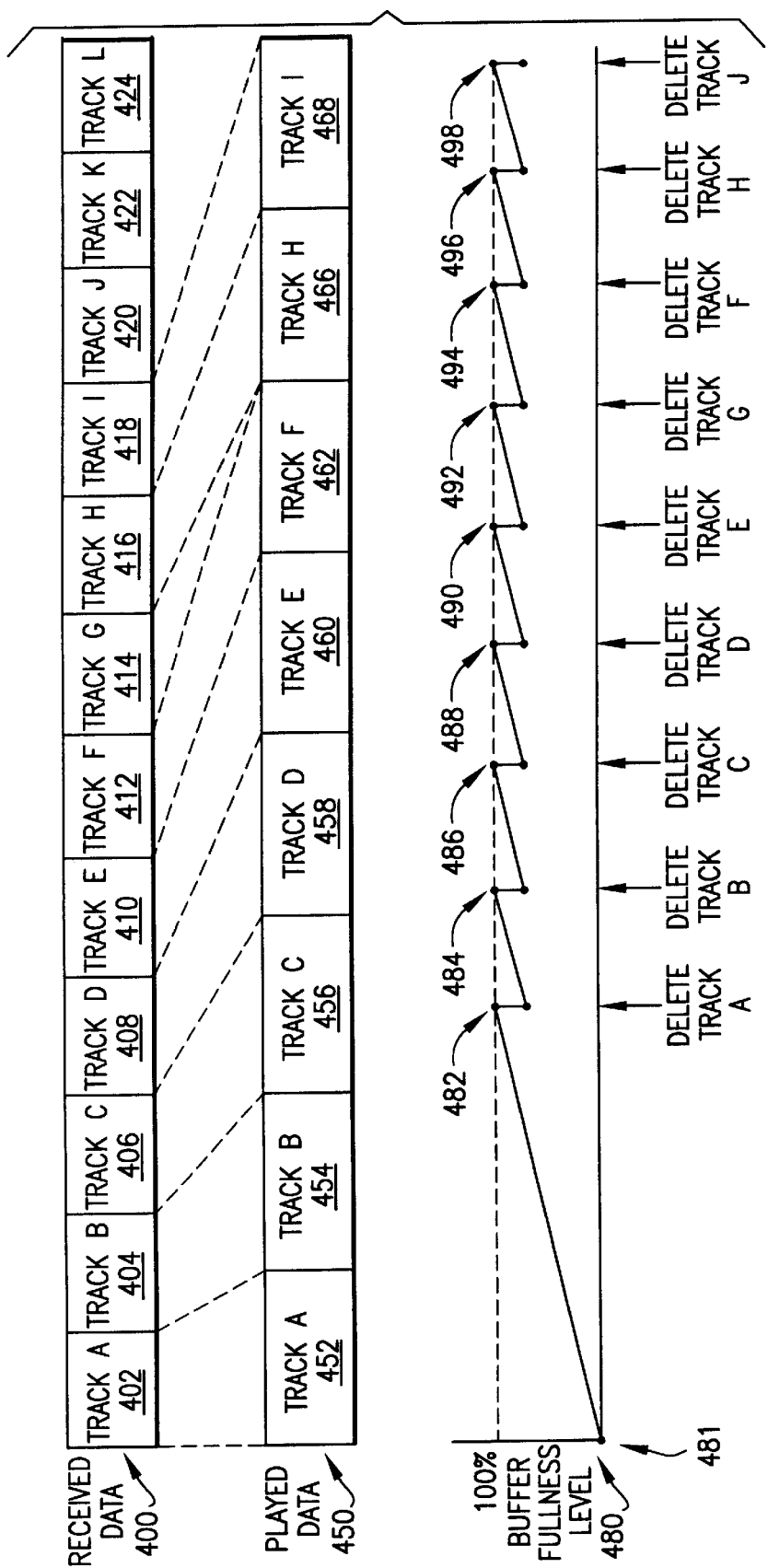
FIG. 4 is an illustration of a data sequence and buffer fullness level in a normal play mode with a single data stream in accordance with the present invention.

FIG. 4 is an illustration of a data sequence and buffer fullness level when a PLAY command is processed for a single data stream in accordance with the present invention. A stream of received data packets is shown at 400, while a corresponding stream of played data packets is shown at 450. A buffer fullness level, which corresponds to the total available storage capacity, regardless of the number of discrete devices, is shown at 480. Time extends from left to right in the figure, such that the length of each packet represents a particular duration. The figure is not precisely to scale.

The PLAY mode shown is a passive mode since the user makes no special requests to listen to tracks other than the current track. The received data includes tracks A–L, shown at packets 402–424, respectively. The played data includes tracks A, B, C, D, E, F, H and I, shown at blocks 452, 454, 456, 458, 460, 462, 466 and 468, respectively. It will be understood that the received data 400 is in a packetized format, where each track can comprise a number of packets or frames, each typically less than one second in duration. However, for simplicity in FIGS. 4–8, each track of received data will be referred to as a single packet, while the duration to play each track is referred to as a block or time block.

The received data arrives at a rate which is greater than the rate at which the audio is played. As a result, the buffer eventually fills up and selected tracks must be deleted before they are played. For example, the track G packet 414 is not played in the current example. Consequently, the scheme is particularly suitable for the transmission of unrelated audio segments, such as musical passages, or short news segments or other commentary. For related audio packets which must be played one after the other, the operational mode used by the broadcaster may be changed by transmitting duplicate segments, or by slowing down the transmission rate to real time. For example, it might be desirable to play audio packets one after another at real-time rates for a "Rolling Stones Album Hour" or a presidential speech.

Various buffer level management schemes may be implemented. With the scheme of FIG. 4, the oldest stored track is deleted when the buffer fullness level approaches 100%. "100%" represents a target level, not necessarily a maximum physical data storage capacity. Point 481 represents a start-up condition, when the receiver or transmitter is first powered. Also at this time, reception of the track A packet 402 begins, and play of the track A block 452 begins. Processing delays for decoding the received data are not reflected in the figure, but are relatively small compared to the length of a track, which may be several minutes. Generally, the playing of a packet (e.g., track) can begin before the packet is fully received. This assumes the single "packets" shown in FIGS. 4–8 actually each comprise a number of individual sub-packets or frames. Each frame, such as an audio frame, must be received in full before the corresponding audio signal can be decoded and output.

If the playing of a packet (e.g., track) cannot begin before the packet is fully received due to the particular data protocol used, then the played track A block 452 will be delayed relative to the received track A packet 402. It is noted that the playing of each track in FIGS. 4–8 takes more time than the reception of each packet due to the higher data rate at which the "received data" is provided.

The buffer fullness level increases at a rate which corresponds to the rate of received data less the rate at which data is discarded, e.g., deleted from memory. The track A block 452 and track B block 454 are played in full, and then the track C block 456 begins to play. At point 482, the buffer fullness level reaches 100%, so the oldest stored packet, the track A packet 402, is deleted from memory. Alternatively, the track B packet 404 could be erased since it has also already been played.

Another implementation choice is to not support "skip back" or "repeat" functions, and discard data once played.

Generally, the oldest stored packet is deleted since it is believed that a user is more likely to wish to replay the first previous track (i.e., the immediately preceding track) than to play the second previous or earlier tracks, so it is preferable to retain the track B packet 404 in memory.

At point 482, it is seen that the buffer fullness level drops by an amount which corresponds to the memory capacity consumed by the track A packet. Also at this time, the track C block 456 continues to play, and the track D packet 408 and track E packet 410 continue to be received and stored in the buffer, thereby increasing the buffer fullness level again. Playing of the track D block 458 begins, and at point 484, the buffer fullness level reaches 100%. At this time, the track B packet 404 is the oldest packet in memory, so the track B packet 404 is erased.

The track E packet 410 and track F packet 412 continue to be received and stored in the buffer, thereby increasing the buffer fullness level to 100% at point 486, at which time the track C packet 406 is deleted. The process continues to point 488, where the track D packet 408 is erased, and to point 490, where the track E packet 410 is erased. At point 492, the track F block 462 is being played, but a packet must be deleted. Accordingly, the track G packet 414 is deleted since it is the oldest stored packet besides track F. The track F packet 412 is not erased at point 492 since this would disturb the continuity of play.

At the next buffer fullness peak, point 492, the track F packet 412 is deleted. At point 496, the track H packet 416 is deleted, and at point 498, the track I packet 418 is deleted.

Alternative schemes may be used for deleting tracks. For example, a track may be deleted based on the amount of time it is stored, or based on the number of intermediate packets between the track in question and the current track. A priority may be assigned to each track so that if two or more tracks can potentially be deleted, the track with the lower priority will be deleted.

Figure 5:
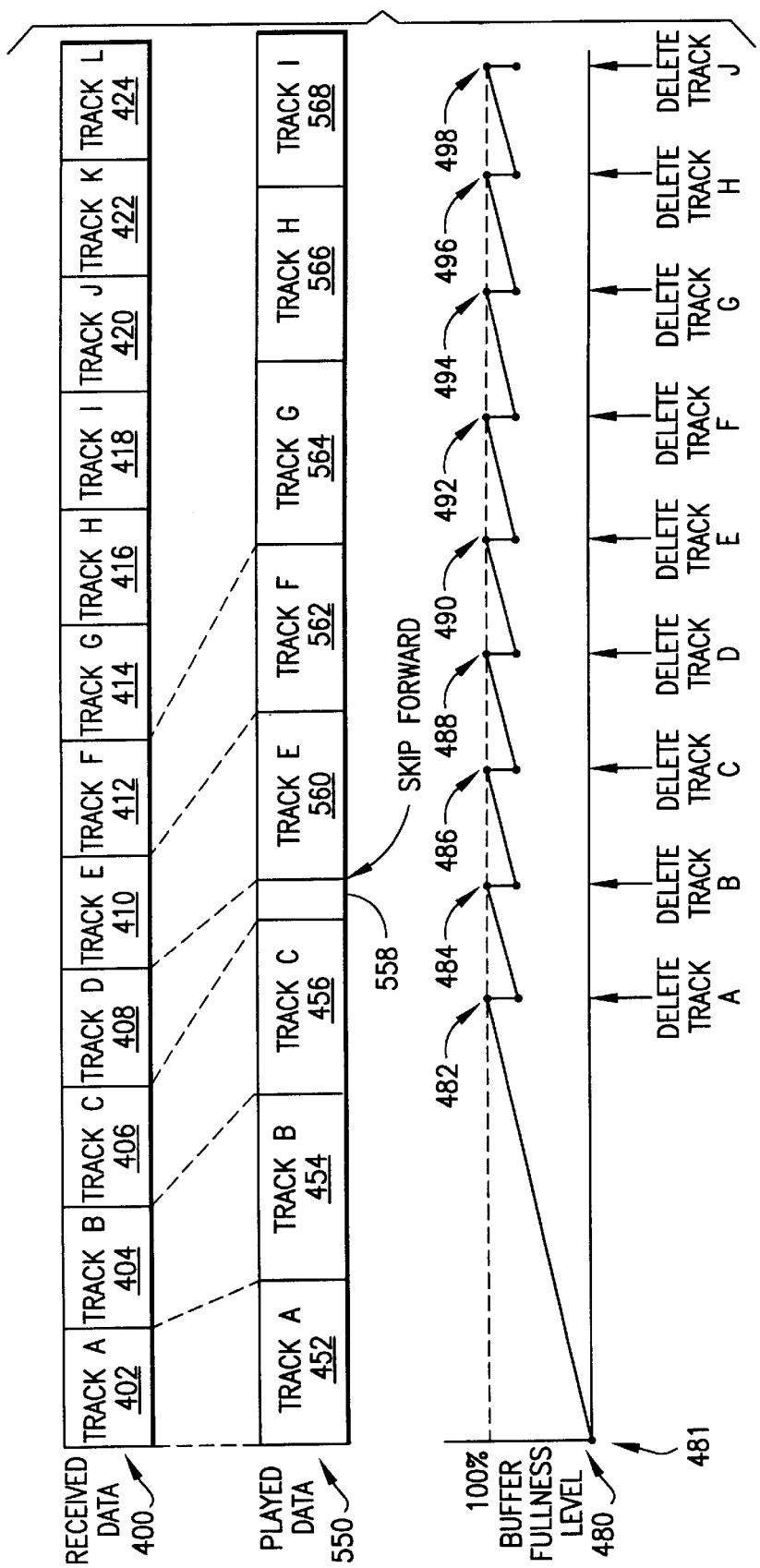
FIG. 5 is an illustration of a data sequence and buffer fullness level in a single skip forward mode with a single data stream in accordance with the present invention.

FIG. 5 is an illustration of a data sequence and buffer fullness level when a single SKIP FORWARD command is processed with a single data stream in accordance with the present invention. Like-numbered elements correspond to elements already mentioned. The played data 550 includes the track A block 452, the track B block 454, the track C block 456, and a track D block 558, which is only a portion of the track D packet 408. When a SKIP FORWARD command is initiated by the user, the playing of the track D block 558 is terminated and the track E block 560 begins to play starting from the beginning.

Subsequently, in this example, a track F block 562, track G block 564, track H block 566 and track I block 568 play in succession. The deletion of packets when the buffer fullness level reaches 100% is the same as shown in FIG. 4, except the track F packet 412 is deleted at point 492, and the track G packet 414 is deleted at point 494. The unplayed portion of the track G packet 414 cannot be deleted at point 492 since the track G block 564 is playing at that time.

Figure 6:
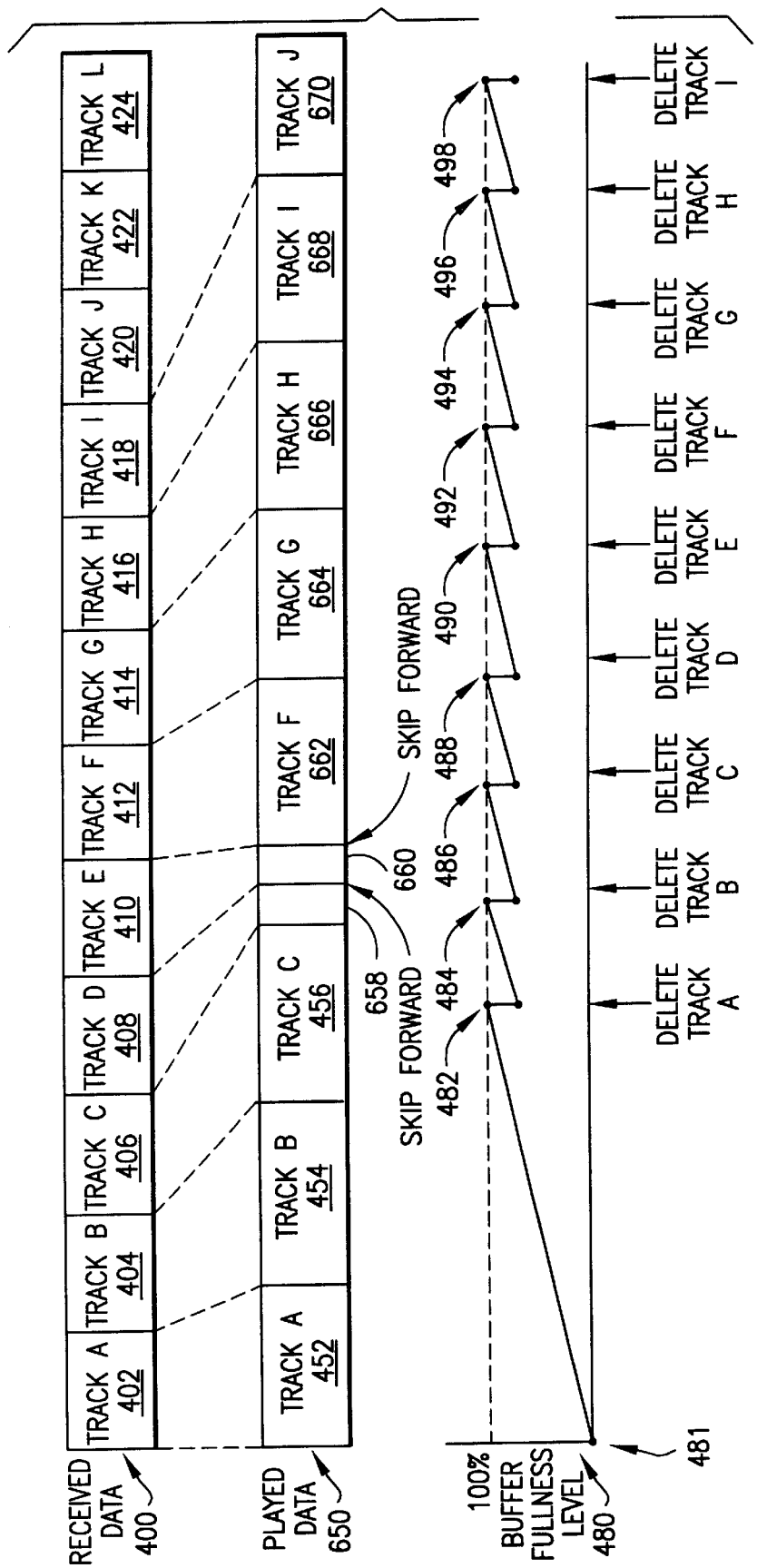
FIG. 6 is an illustration of a data sequence and buffer fullness level in a double skip forward mode with a single data stream in accordance with the present invention.

FIG. 6 is an illustration of a data sequence and buffer fullness level when a double SKIP FORWARD command is processed with a single data stream in accordance with the present invention. Like-numbered elements correspond to elements already mentioned. The played data 650 includes the track A block 452, the track B block 454, the track C block 456, a track D block 658, which is only a portion of the track D packet 408, and a track E block 660, which is only a portion of the track E packet 410. When a first SKIP FORWARD command is initiated by the user, the playing of the track D block 658 is terminated and the track E block 660 begins to play. Then, when a second SKIP FORWARD command is initiated by the user, the playing of the track E block 660 is terminated and the track F block 662 begins to play.

Subsequently, in this example, a track G block 664, track H block 666, track I block 668 and track J block 670 play in succession. The deletion of packets when the buffer fullness level reaches 100% is the same as shown in FIG. 5, except the track I packet 418 is deleted at point 498. Thus, the tracks are deleted in the same order as received for the time period shown. Essentially, the played data "catches up" with the stored data.

The example shown corresponds to a scenario where the user is listening to a current track (e.g., track D) but it not satisfied with the track and/or would like to know what other tracks are available. Thus, the user, issues a first SKIP FORWARD command to listen to track E, and a second SKIP FORWARD command to listen to track F. The user is then satisfied with track F and listens to the entire track as well as the following tracks in full.

Note that the track D packet 408 is stored in full in memory when a request is made to play the track. The track E packet 410 is stored almost in full when a request is made to play the track. The track F packet 412 is stored only in part when a request is made to play the track. Thus, a track may be played when only part of it is stored since the remainder will be available before it is required to play, assuming processing (e.g., packet decoding) delays are minimal.

Of course, data which has not yet been received cannot be played. Thus, in the example of FIG. 6, if a third SKIP FORWARD command were issued before the track G packet 414 was available, for example, at point 486, then track G could not be played, and an alert signal such as a beep is preferably provided to inform the listener to wait to access new tracks. At this time, the user may decide to return to one of the earlier tracks, using the SKIP BACKWARD function, as discussed next.

Alternatively, if a third SKIP FORWARD command were issued before the track G packet 414 was available, the play back can be moved as far forward as possible (as near to the end), which is the point at which data is currently arriving. Or, the output can be muted until track G is available.

Figure 7:
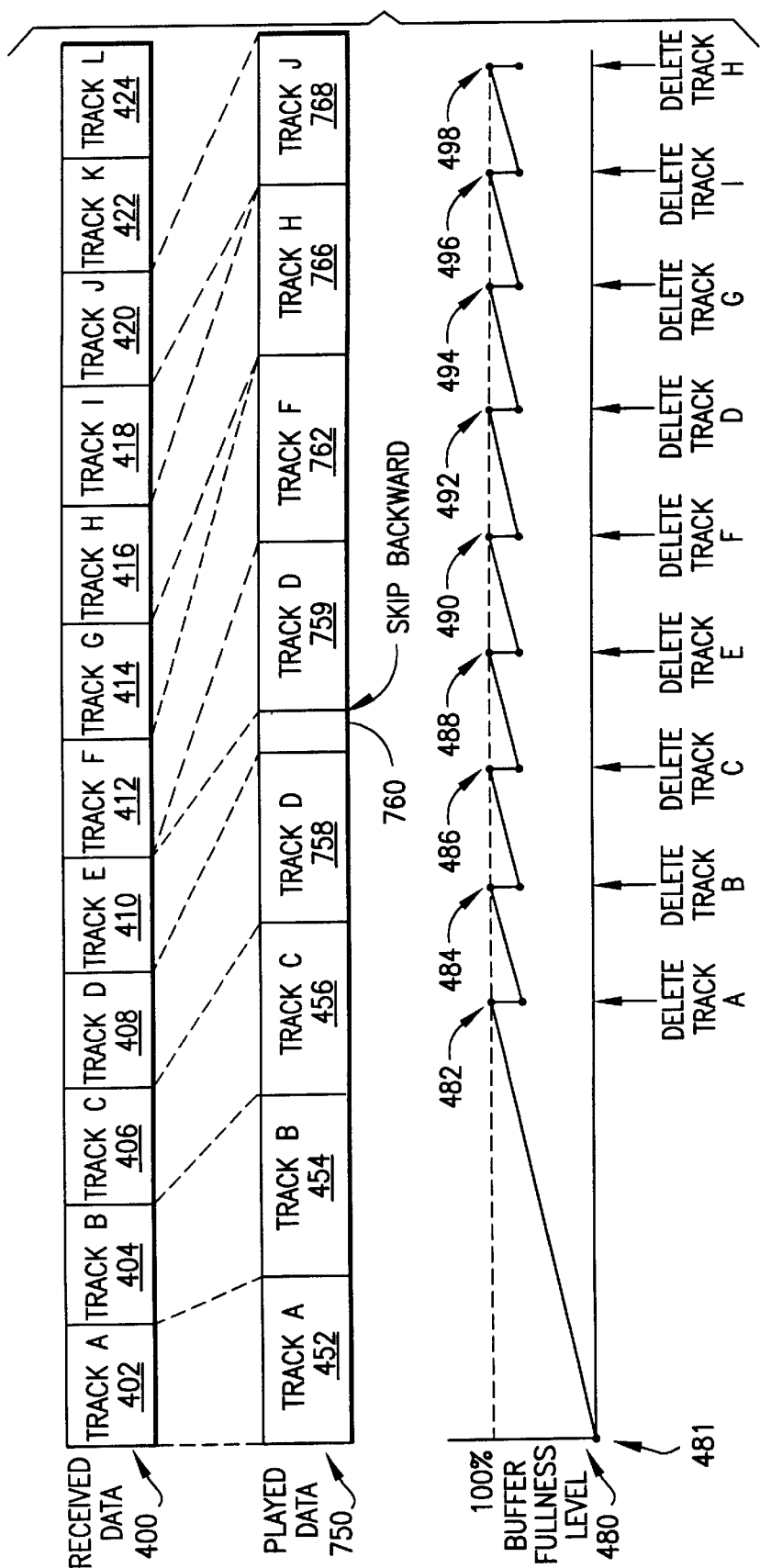
FIG. 7 is an illustration of a data sequence and buffer fullness level in a skip backward mode with a single data stream in accordance with the present invention.

FIG. 7 is an illustration of a data sequence and buffer fullness level in a SKIP BACKWARD mode with a single data stream in accordance with the present invention. Like-numbered elements correspond to elements already mentioned. The played data 750 includes the track A block 452, the track B block 454, the track C block 456, the track D block 758, and a track E block 760, which is only a portion of the track E packet 410. When a first SKIP BACKWARD command is initiated by the user, the playing of the track E block 760 is terminated and the previous track, track D shown at block 759, begins to play. Block 759 is the same as block 758. Subsequently, in this example, a track F block 762, track H block 766 and track I block 768 play in succession.

Note that if the user delayed in issuing the SKIP BACKWARD command until point 488, the track D packet 408 would have been deleted and therefore could not be repeated. This can be confirmed by referring to point 488 in FIG. 4. The buffer size will affect the amount of time that tracks can be retained.

At point 488, since the track D block 759 is playing, the unplayed portion of it cannot be deleted. The oldest stored track which should be deleted is the track E packet 410. Alternatively, it is possible to delete the track F packet 412.

At point 490, the track F packet 412 is deleted since it is the oldest stored track. The unplayed portion of the track D packet 408 cannot be deleted since the track D block 759 it is still playing. Alternatively, the track G packet 414 could be deleted. At point 492, the track D packet 408 has finally completed playing and any remaining data thereof can be deleted.

At point 494, the track G packet 414 is deleted since it is the oldest stored track. The unplayed portion of the track H block 766 cannot be deleted since it is currently playing. Alternatively, the track I packet 418 could be deleted.

Point 496 corresponds approximately to the ending time of track H block 766. The track H packet 414 could be deleted since it would be the oldest stored track. However, it may be desirable to implement a minimum delay between the time a block has completed playing and the time when it is available to be deleted. This gives the user a few moments to decide to replay the just-completed track. In this case, the track I packet 418 is deleted. Alternatively, the track J packet 420 could be deleted. At point 498, the track H packet 416 is finally deleted.

Figure 8:
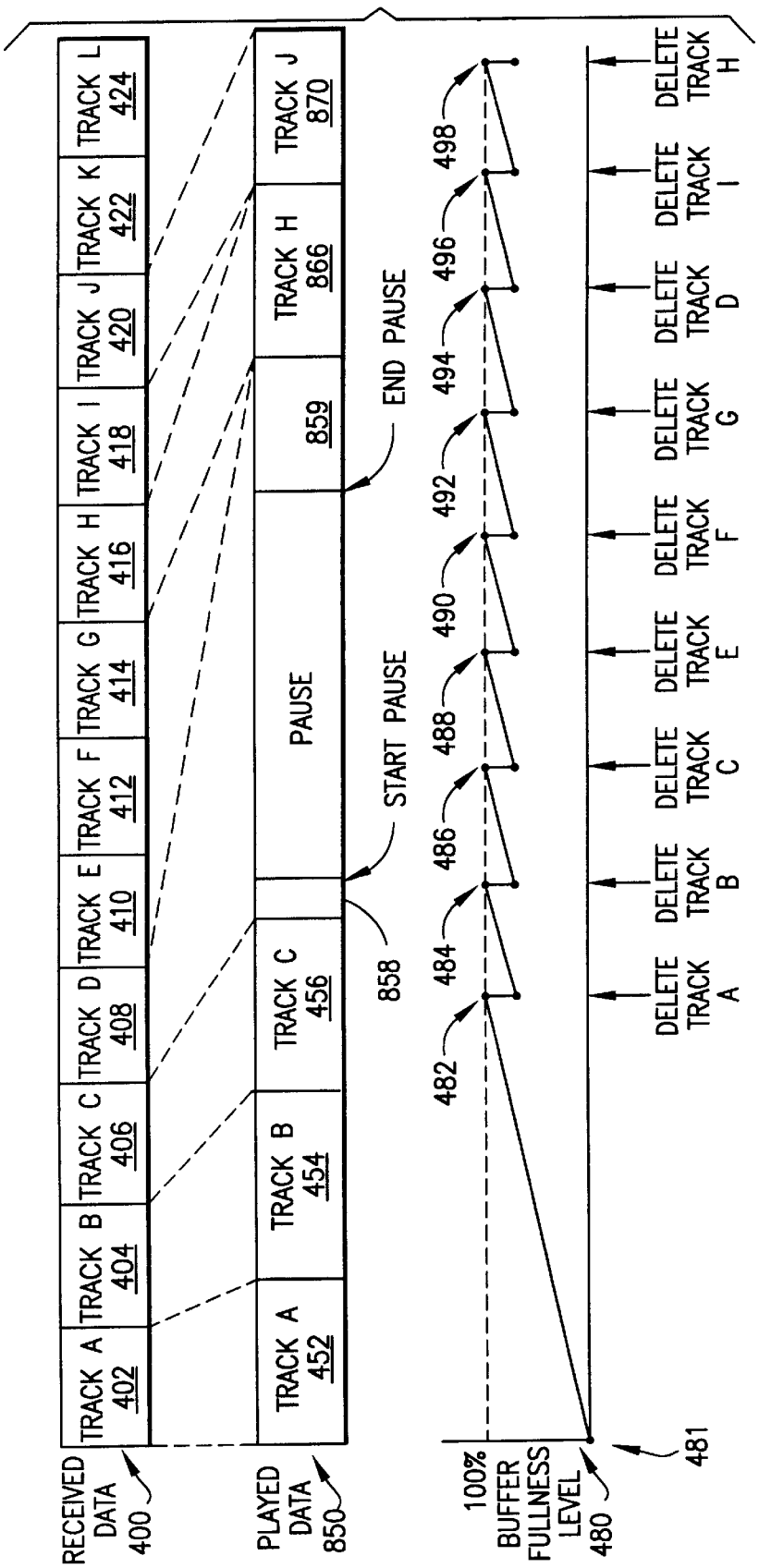
FIG. 8 is an illustration of a data sequence and buffer fullness level in a pause mode with a single data stream in accordance with the present invention.

FIG. 8 is an illustration of a data sequence and buffer fullness level when a PAUSE command is processed with a single data stream in accordance with the present invention. Like-numbered elements correspond to elements already mentioned. The played data 850 includes the track A block 452, the track B block 454, the track C block 456, and the track D block 858, which is only a portion of the track D packet 408. When a START PAUSE command is initiated by the user, the playing of the track D block 858 is terminated, and the system pauses.

At points 482, 484 and 486, the track A packet 402, track B packet 404 and track C packet 406, respectively, are deleted. Alternatively, at point 486, the track E packet 410 could be deleted. At point 488, it is desirable to maintain the currently paused track in memory (e.g., track D) so that it can be continued later, so the track E packet 410 is deleted. Alternatively, the track F packet 412 could be deleted. At point 490, the pause mode continues, so the track F packet 412 is deleted. Alternatively, the track G packet 414 could be deleted.

Subsequently, the user issues an END PAUSE command, and the track D block resumes playing as shown at block 859. At point 492, the track G packet 414 is deleted. Alternatively, the track H packet 416 could be deleted. After the track D block 859 has played, track H is oldest track in memory, and therefore begins to play as shown at block 866. Alternatively, track I or even track J could have played. At point 494, track D is finally available to delete. At point 496, the track I packet 418 is deleted. Alternatively, the track J packet 420 could be deleted.

After the track H block 866 is played, track J is oldest track in memory, and therefore begins to play as shown at block 870. Alternatively, track K or even track L could have played since the track L packet 424 is just being received when the track H block 866 is ending. At point 498, the track H packet 416 is deleted, although the track K packet 422 could be deleted instead.

Figure 9:
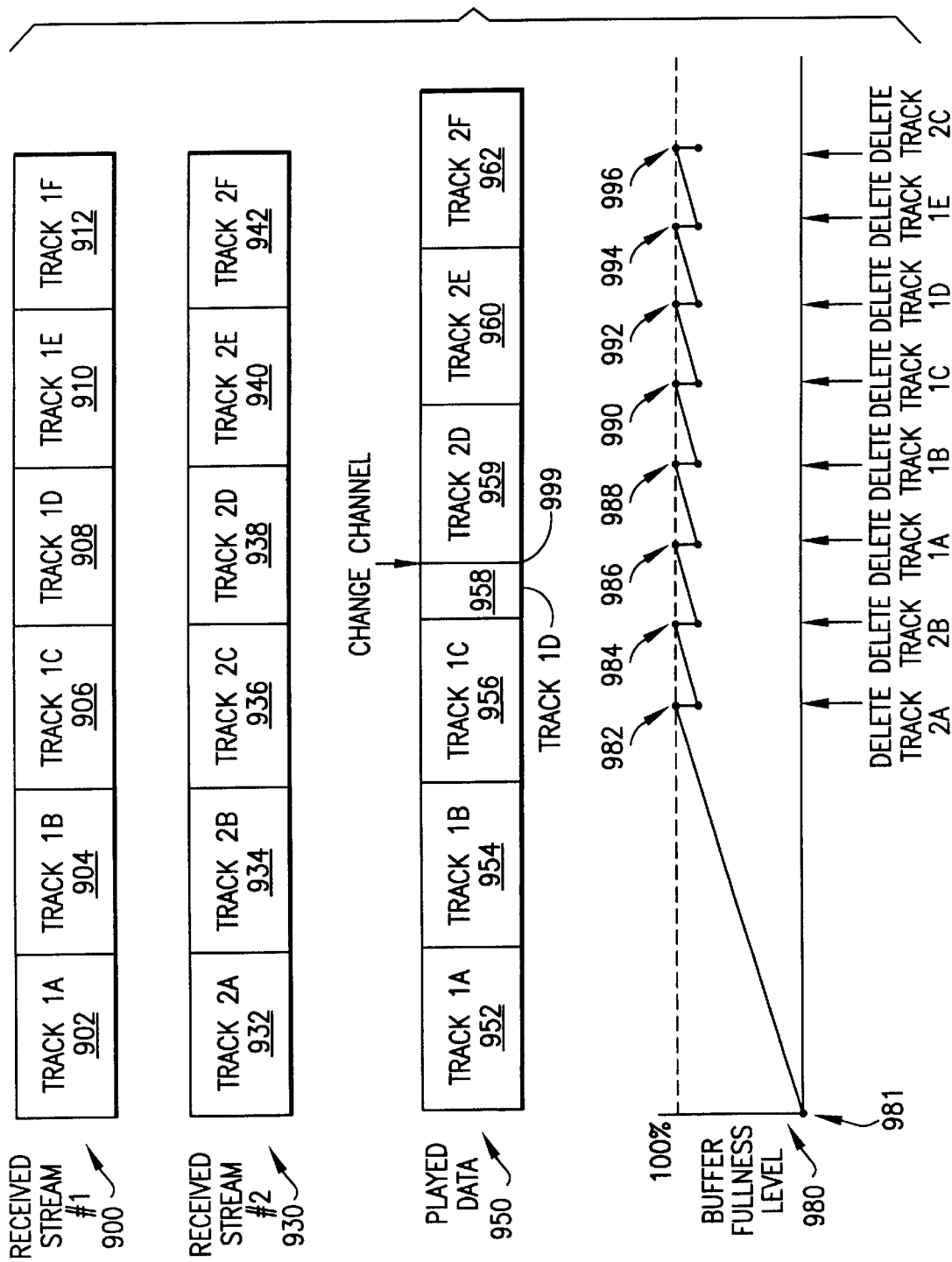
FIG. 9 is an illustration of a data sequence and buffer fullness level in a normal play mode with multiple concurrent data streams in accordance with the present invention.

FIG. 9 is an illustration of a data sequence and buffer fullness level when a CHANGE CHANNEL command is processed with multiple concurrent data streams in accordance with the present invention. Recall that a channel refers to a programming service stream. A first programming service stream of received data packets is shown at 900, while a second programming service stream of received data packets is shown at 930, and an associated stream of played data packets is shown at 950. A buffer fullness level, which corresponds to the total available storage capacity, regardless of the number of discrete devices, is shown at 980. Time extends from left to right in the figure, such that the length of each packet represents a particular duration. The figure is not precisely to scale.

The received data in the first stream 900 includes tracks 1A–1F, shown at packets 902–912, respectively, while the received data in the second stream 930 includes tracks 2A–2F, shown at packets 932–942, respectively. ,The played data includes tracks 1A, 1B, 1C, 1D, 2D, 2E and 2F, shown at blocks 952, 954, 956, 958, 959, 960 and 962, respectively. Block 958 represents only a portion of the track 1D packet 908 since a CHANGE CHANNEL COMMAND is issued at point 999 to switch the system from the first stream 900 to the second stream 930.

Only two programming service streams are shown in the example but additional streams may be provided. Furthermore, it will be understood that the received data streams 900 and 930 are in a packetized format, where each track can comprise a number of packets. However, for simplicity in FIG. 9, each track of received data will be referred to as a single packet, while the duration to play each track is referred to as a block or time block.

Each data stream may be received at a real time rate, which is the same as the rate at which the audio is played, or at a faster than real time rate. The example of FIG. 9 uses a real time delivery rate. In either case, the total rate of all streams is greater than the play rate. As a result, the buffer eventually fills up and selected tracks must be deleted before they are played. With multiple streams, the decision process for deleting tracks is somewhat more complicated. Recall that for the single stream case, the oldest stored track was deleted.

With multiple streams, it is desirable to delete the oldest stored tracks in the one or more channels that are not currently being played. However, at least one track should be immediately available at all times since the user may switch to another programming service stream at any time. After the tracks in the non-playing streams are deleted to the extent possible, the oldest stored tracks for the currently played stream should be successively deleted. The example of FIG. 9 follows this strategy.

Optionally, depending on the expected user behavior, it may be desirable to have approximately the same number of stored tracks for each programming service stream so that when the user changes streams, the user can SKIP BACKWARD to another one or more tracks. Or, the user may select one or more streams as being favorites so that the deletion process is biased to maintain the tracks of the favorite streams to the extent possible. The receiver may automatically assign the favorite programming service streams based on a profile of the user's past selections.

Point 981 of the buffer fullness level chart 980 is a start up point where the user turns on the power to the receiver. Points 982, 984, 986, 988, 990, 992, 994 and 996 represent a 100% buffer fullness. Prior to the CHANGE CHANNEL command, the oldest track in the non-playing stream (stream 900) is deleted as the buffer becomes full. For example, at points 982 and 984, the track 1C block 956 of the first programming service stream is playing, so the packets 932 and 934 for tracks 2A and 2B, respectively, are deleted.

After the CHANGE CHANNEL command, track 2D as shown at block 959 begins to play. Therefore, at the next buffer fullness point, e.g., point 986, the oldest track in the non-playing stream, track 1A, shown at packet 902, is deleted. Subsequently, at point 988, track 2D continues to play, and the track 1B packet 904 is deleted. At points 990 and 992, track 2E shown at block 960 plays, while the track 1C and 1D packets, 906 and 908, respectively, are deleted.

At point 994, track 2F shown at block 962 plays, and the track 1E packet 910 is deleted. At point 996, track 2F continues to play, but the next track in the non-playing channel, track 1F packet 912, cannot be deleted since it overlaps with track 2F and therefore must be available in case the user switches to stream 900 during the playing of track 2F. Therefore, the oldest stored packet in the current programming service stream, track 2C, is deleted.

The other user commands discussed previously can also be used with multiple concurrent data streams.

Figure 10:
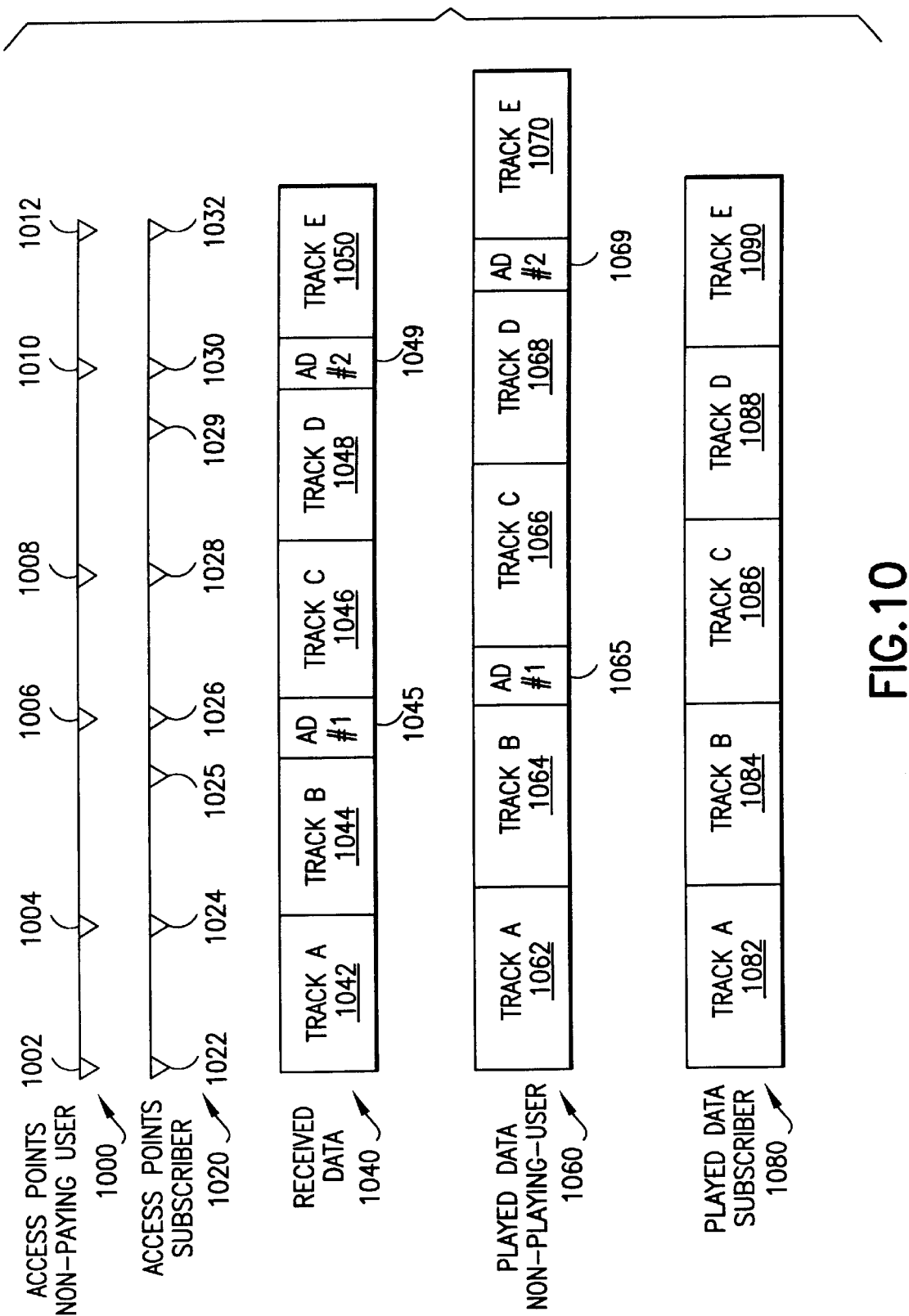
FIG. 10 is an illustration of a data sequence and access points for non-paying users and for subscribers in accordance with the present invention.

FIG. 10 is an illustration of a data sequence and access points for non-paying users and for subscribers in accordance with the present invention. The input stream includes an embedded advertisement, while the free control stream includes splice points for musical selections, but not starting points for advertisements. The pay control stream includes both. A paying subscriber is able to avoid buffering and outputting the advertisement.

Access points for non-paying users are shown generally at 1000, and include points 1002, 1004, 1006, 1008, 1010 and 1012. Access points for subscribers (e.g., paying users) are shown generally at 1020, and include points 1022, 1024, 1025, 1026, 1028, 1029, 1030 and 1032.

A received data stream is shown generally at 1040, and includes a track A packet 1042, a track B packet 1044, a first advertisement packet 1045, a track C packet 1046, a track D packet 1048, a second advertisement packet 1049 and a track E packet 1050. It will be understood that the received data stream 1040 is a packetized format, where each track can comprise a number of packets. However, for simplicity in FIG. 10, each track of received data will be referred to as a single packet, while the duration to play each track is referred to as a block or time block.

Played data for the non-paying user is shown generally at 1060, and includes a track A block 1062, a track B block 1064, a first advertisement block 1065, a track C block 1066, a track D block 1068, a second advertisement block 1069 and a track E block 1070.

Played data for the subscriber is shown generally at 1080, and includes a track A block 1082, a track B block 1084, a track C block 1086, a track D block 1088 and a track E block 1090.

The schemes described in FIGS. 4–9 above target a subscription (e.g., access controlled) service that does not attempt to deal with a mixture of music and advertisements in the service. With these schemes, a user could skip a commercial as easily as skipping an unwanted music selection.

Figure 11:
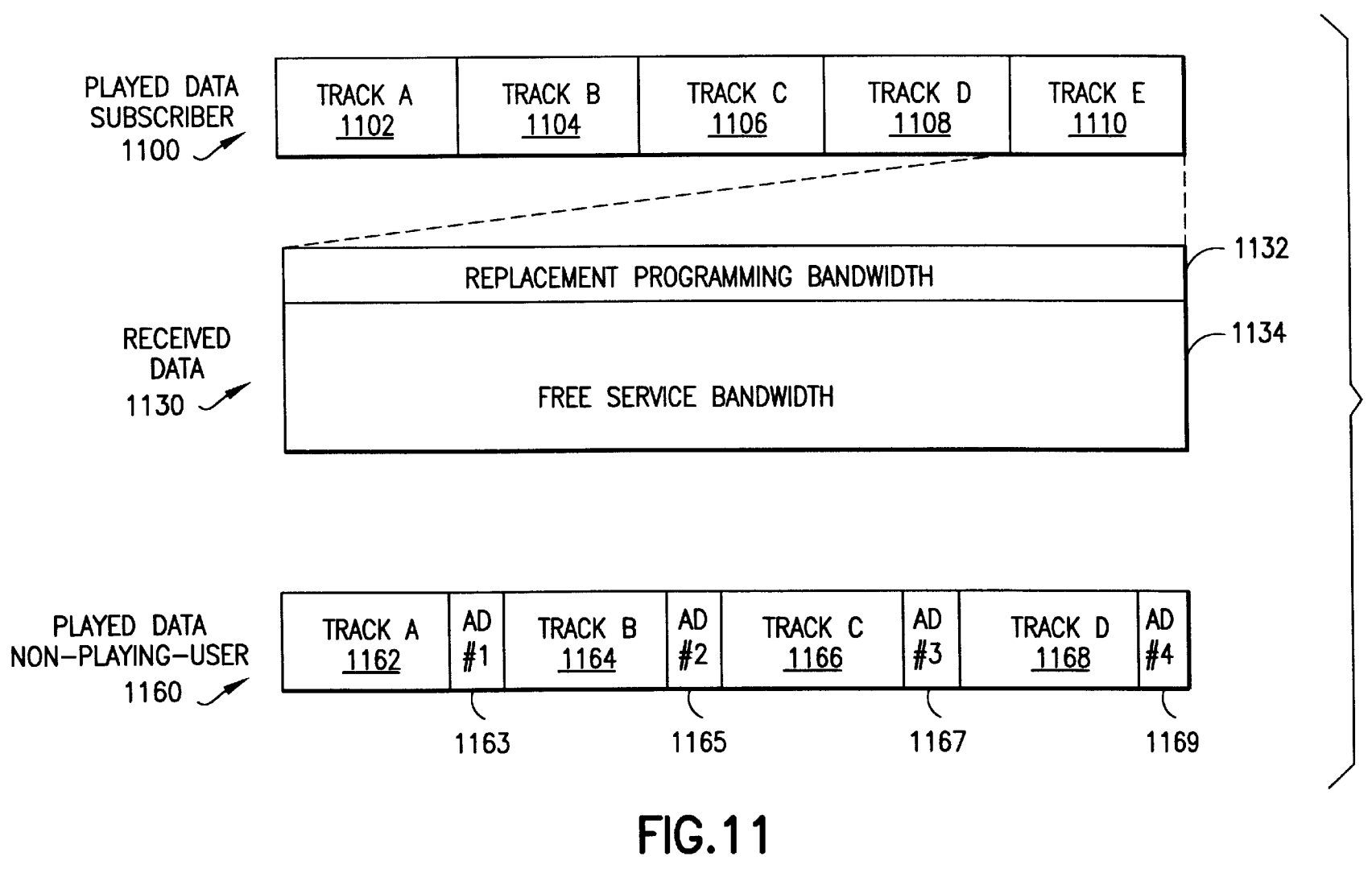

FIGS. 10 and 11 relate to a scheme that allows the application of access control, with the goal that a paying subscriber could listen to commercial free audio, while the non-paying consumer would hear a combination of music and advertisements. To achieve this, a portion of the transmitted bandwidth is dedicated to access-controlled program filler material that is only available to a paying subscriber. This material can be buffered and played out in lieu of a commercial.

As shown in FIG. 10, the subscriber is granted additional access points which allow the bypassing of commercials in the received data stream 1040. For example, access points 1025 and 1026 allow the subscriber to bypass the first advertisement packet 1045. This bypass may be automatic or at the subscriber's discretion. For example, if left to the user's discretion, the user may fast forward or skip forward past a commercial. The receiver may have a button to suppress the commercials.

Additionally, access points 1029 and 1030 allow the subscriber to bypass the second advertisement packet 1049. Thus, the subscriber can play the track C block 1086 directly after the track B block 1084 without listening to an advertisement. Similarly, the subscriber can play the track E block 1090 directly after the track D block 1088. It may be possible to force the subscriber to listen to certain commercials by disabling the ability to FAST FORWARD or SKIP FORWARD, however, the user would still have the option to change the programming service stream.

The non-paying user cannot bypass the first and second advertisement packets 1045 and 1049, respectively. Therefore, the played data for the non-paying user includes the first advertisement block 1065 and the second advertisement block 1069.

FIG. 11 is an illustration of a replacement programming bandwidth and a free service bandwidth in accordance with the present invention. The played data for a subscriber includes a track A 1102, a track B 1104, a track C 1106, a track D 1108 and a track E 1110. The received data 1130 includes a replacement programming bandwidth 1132 and a free service bandwidth 1134. The played data for the non-paying user includes track A 1162, a first advertisement 1163, track B 1164, a second advertisement 1165, track C 1166, a third advertisement 1167, track D 1168 and a fourth advertisement 1169. Assuming the amount of data in the subscriber's played data 1100 is the same as the amount of data in the non-paying user's played data, the replacement programming bandwidth is about one-fifth that of the free service bandwidth. A fixed channel bandwidth is also assumed.

It will be appreciated that other sequences of tracks and advertisements are possible. For example, it may be desirable to play several tracks in a row without a commercial even for the non-paying user.

A variation on the scheme to provide a different class of service to a paying subscriber is to deliver a stream that is used by the subscriber to cover for those portions of the service in which advertising is being sent. As shown in FIG. 11, an encrypted (pay only) stream 1100 is sent in parallel with the free stream 1160. A decoder that is able to decrypt the encrypted stream will be able to skip advertisements and keep its buffer from underflowing by taking data from the replacement programming that is being sent in the multiplex at a lower than playback rate.

In the example, track E 1110 is delivered on the multiplex over a four-track interval (e.g., from track A 1102 to track D 1108), and timed such that it is available in a buffer as the buffer begins to run empty, after having avoided storing advertising segments. The service heard by the paying customer consists of tracks A-E, and beyond, while the non-paying listener hears tracks with advertising in between, and does not hear track E at all.

For this approach, note that it would be possible to deliver the free programming at a real time rate. The low-end receiver is therefore cheaper. A high-end box that supports subscription access would buffer enough data to be able to skip the commercial portion. During a start-up, the buffers need time to fill before the commercial can be safely skipped.

The scheme shown involves either partial pre-delivery of alternate programming to fill commercial breaks, or pre-delivery of a pointer to alternate bandwidth for the fill programming. Information regarding splicing and decoding of the received data is carried in the access controlled portion of the information. The free or lower cost portion of the service need not contain identifying markers that might allow the automatic identification of the commercial breaks.

The access control system can be operated in two modes. In the subscription mode, the user always hears commercial free programming. In a metered mode, the user hears some but not all of the commercials, and pays based on the commercial content that is skipped.

The composite (i.e., subscriber) service described is based on pre-recorded material which is at least partially pre-delivered. Pre-delivery may not be suitable for applications such as sports events where material cannot be omitted for the non-paying users. Commentary on the event, interactive statistical information, games or gambling are possible alternatives to the commercial content. Since live events such as sports broadcasts require a relatively large bandwidth, bandwidth sharing between the commercial and substitute source might be possible. For video applications, it would therefore be desirable to run the commercials in film mode to minimize the required bandwidth. This makes the commercials easily identified for possible automatic removal.

The composite service runs mostly from the buffer. The buffer can be emptied, but most of the time it is not. The buffer control can be thought of as having two buffers. A first buffer collects the free program content, and a second buffer collects the pay or premium programming. Control information directs the write and read controls of each buffer. The write process for the free buffer can either store all information, and discard the undesired portion at the output, or, in a more costly implementation, optimally store only the desired portion of the free service.

The pay buffer collects all the PIDs required for the fill portion of the premium service. A fast forward effect can be achieved by going to real time playback of the free portion of the service, but the user may have to wait for the pay buffer to fill before the commercials go away again, or listen to whatever the user skipped in the jump to real time. It is assumed that the material is delivered with a play time program clock reference (PCR) and presentation time stamp (PTS), so the decoder does not have to modify these when the data is played back. It is also assumed that the transmitter is sending exactly enough data to replace the commercial content and no more.

The function of the feature can be extended by having additional memory and data. A user can skip forward further with a greater buffer depth and premium program channel bandwidth. Running more programming than required to fill the commercial space creates a requirement to discard programming when it is not needed. This should be done consistently so the transmission facility can correctly predict the sufficiency of the minimum memory configured units.

Units having larger than minimum memories could be selective in the deletion or storage of material. If the encoder marks the unneeded program segments (i.e., tracks) for continuous play, the decoder can delete, or not store, these segments as desired. An earliest start time is required for the unit with extra memory. This field identifies the earliest point in time at which a program segment may be played. The fast forward feature would allow one to continue to go forward through stored data until there is nothing further available to play; that is, until the earliest start time of the available tracks has not yet been reached. Going beyond this point would mean listening to commercials until the buffer refills.

A non-pay version of the fast forward mechanism can be supported by placing a commercial at the beginning of each segment. The fast forward button would always cause a commercial to start, but the user could skip the current track or commercial.

Based on the discussion above, four possible modes of operation can be defined as set forth in Table 1, below. The last column indicates whether a PTS modification is required.

TABLE 1

| Service Class | Fast Forward | Commercial Free | Metered | Subscribed | Super Commercial | Buffer Control | PTS Mod. |
|---|---|---|---|---|---|---|---|
| 1 | yes | yes | yes | premium | no | receiver | yes |
| 2 | no | yes | yes | premium | no | transmit | yes |

TABLE 1-continued

| Service Class | Fast Forward | Commercial Free | Metered | Subscribed | Super Commercial | Buffer Control | PTS Mod. |
|---|---|---|---|---|---|---|---|
| 3 | yes | no | no | basic | yes | receiver | yes |
| 4 | no | no | no | basic | no | none | no |

For class 1 service, the added material exceeds 100% of the commercial content's duration. The receiver buffer will ultimately overflow unless the receiver removes program material (i.e., tracks) from its memory. The proposed method is to delete the track with earliest play time in the buffer as the memory space is needed. Fast forward selects the program in memory with the next oldest play time in memory. For this class of service, the user may elect to fast forward, or to passively listen to commercial free programming. Skipping a selection may delete it from memory, but this is optional. The user may mark a segment to save, but it will occupy buffer space until it is played.

For class 2 service, the transmitter is managing the buffer fullness. There is no excess programming sent beyond that required to allow commercial free service. Fast forward is nominally not supported because commercial free operation can not be maintained. Skipping forward may cause the buffer to be emptied, and the receiver will have to play the class 4 programming until there is enough data to resume commercial free operation. In this class of service, the earliest play time and the actual play time may be the same.

For class 3 service, there is partial replacement of the program content available. This is a "super-commercial" mode, where playing a specific commercial provides the information to decrypt one or more additional tracks. The decryption information is transmitted over the duration of the commercials, but whether the information can actually decrypt anything is only known at the end of the track. There is not enough programming available to eliminate all commercials, so some commercials must be played.

For class 4 service, the receiver functions as a unit with no buffer. There is no data to provide to the buffer since all programming is played and delivered in real time. This is the same as a conventional analog radio broadcast.

Classes 1–3 must identify the free memory required to store a track if the track is not played real time. If there is a start time, the memory requirement up to the start time is also needed. This allows a unit to not start saving something it cannot store. There is no point in filling the buffer with a track that will have to be dropped because it exceeds available space. The transmitter generally will model the decoder's memory capacity to control the amount of transmitted data, e.g., to avoid overflow.

All of the classes of service described depend on time to control the start of a program segment and to do all buffer housekeeping. The simplest method is to use a single PCR to control playback of all program segments. The delay or advance of a play time may require modification of the PTS, but this is a static value which is equal to the difference between the start time and the transmitted PTS. This restriction is not required, but simplifies operation.

In the examples above, the user is listening to a single service that may be played in differing modes. But, generally, there is a series of program segments that the user may manually select or reject. By the addition of identifying characteristics of the program segments and application of user preferences, a virtual service can be created that only contains program segments that are acceptable to the user. In a large multiplex such as a satellite channel, the user may create a virtual service by only accepting program content that is deemed acceptable. This programming filter could reject entire PIDs due to categorical content. Specific segments may be filtered by a variety of conditionals.

Accordingly, it can be seen that the present invention provides a method and apparatus for a broadcast digital radio service in which the user is afforded various interactive features. By transmitting data at a faster than real time rate, the user has the ability to select among a greater range of programming by skipping tracks. Additionally, segments of the programming, including tracks of music or the like as well as commercial segments, can be managed to provide different tiers of service.

The user may select favorite or disliked tracks which are identified and stored for subsequent use. In particular, disliked tracks can be automatically skipped, while favorite tracks can be automatically recovered and played, or the user can be prompted to recover them if desired.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for broadcasting digital programming services to a plurality of decoders, each service having a plurality of program segments, comprising the steps of:

packetizing said plurality of program segments for transport in at least one data stream, each of said program segments defining a separate track of the associated programming service;

providing data which indicates access points for said program segments; and broadcasting said packetized program segments at an overall data rate which is greater than a play rate of the programming services; wherein each decoder is adapted to:

receive said packetized programming segments;

temporarily store at least a portion of the program segments in a buffer prior to playback;

allow a user to skip forward or backward to a track which is stored in the buffer based on said access points while playing a current one of said tracks; and delete at least one track in the buffer when a buffer fullness level is reached.

2. The method of claim 1, wherein:

said packetized program segments are broadcast in one data stream at a rate which is greater than a play rate of the programming services.

3. The method of claim 1, wherein:

when the buffer fullness level is reached, the oldest track which is stored in the buffer is deleted.

4. The method of claim 1, comprising the further step of:
transmitting control data with said program segments to provide information regarding the contents of said program segments.

5. The method of claim 1, wherein each of said program segments comprises a separate multimedia track, comprising the further step of:
transmitting control data with said program segments for use in providing a multimedia clip corresponding to said multimedia track regarding the contents of said track.

6. The method of claim 1, wherein:
said overall data rate is adapted to be reduced, at least temporarily, to said play rate.

7. The method of claim 1, comprising the further step of:
transmitting segment identifiers with said packetized program segments; wherein, at said decoder:
said segment identifiers are adapted to be stored in memory according to a user command; and
said program segments are selectively recovered according to the segment identifiers.

8. A method for broadcasting digital programming services to a plurality of decoders, each service having a plurality of program segments, comprising the steps of:
packetizing said plurality of program segments for transport in at least one data stream, each of said program segments comprising one of a separate non-commercial track or a separate commercial track;
providing data which indicates access points for said program segments; and
broadcasting said packetized program segments at an overall data rate which is greater than a play rate of the programming services; wherein each decoder is adapted to:
receive said packetized programming segments;
temporarily store at least a portion of the program segments in a buffer prior to playback;
delete at least one program segment in the buffer when a buffer fullness level is reached; and
allow a user to skip forward or backward to a track which is stored in the buffer while playing a current one of said tracks; such that:
a plurality of service tiers are provided, one of said service tiers allowing a user to skip over at least some of the commercial tracks, while another one of said service tiers does not allow a user to skip over the commercial tracks.

9. A method for broadcasting digital programming services to a plurality of decoders, each service having a plurality of program segments, comprising the steps of:
packetizing said plurality of program segments for transport in a plurality of data streams, including a first channel of first program segments in a first data stream, and a second channel of second program segments in a second data stream, each of said program segments defining a separate track of the associated programming service;
providing data which indicates access points for said first and second program segments of said first and second channels;
broadcasting said packetized program segments at an overall data rate which is greater than a play rate of the programming services; wherein each decoder is adapted to:
receive said packetized programming segments;
temporarily store at least a portion of the program segments in a buffer prior to playback;
allow a user to skip from a currently playing first track on the first channel to a starting point of a second track in the second channel; and
delete at least one track in the buffer when a buffer fullness level is reached.

10. A method for broadcasting digital programming services to a plurality of decoders, each service having a plurality of program segments, comprising the steps of:
packetizing said plurality of program segments for transport in at least one data stream, each of said program segments comprising one of a separate non-commercial track or a separate commercial track;
broadcasting said packetized program segments at an overall data rate which is greater than a play rate of the programming services;
communicating at least one of the non-commercial program segments as replacement programming in a replacement programming bandwidth of the at least one broadcast data stream, such that:
a plurality of service tiers are provided, one of said service tiers allowing a user to recover the non-commercial replacement program segments, while another one of said service tiers allows a user to recover the commercial tracks in lieu of recovering the non-commercial replacement program tracks;
wherein each decoder is adapted to:
receive said packetized programming segments;
temporarily store at least a portion of the program segments in a buffer prior to playback;
delete at least one program segment in the buffer when a buffer fullness level is reached.

11. An apparatus for broadcasting digital programming services to a plurality of decoders, each service having a plurality of program segments, comprising:
a packetizer for packetizing said plurality of program segments for transport in at least one broadcast data stream, each of said program segments defining a separate track of the associated programming service;
means for providing data which designates access points for said program segments; and
means for broadcasting said packetized program segments in at least one data stream at an overall data rate which is greater than a play rate of the programming services; wherein each decoder is adapted to:
receive said packetized programming segments;
to store at least a portion of the program segments in a buffer prior to playback;
allow a user to skip forward or backward to a track which is stored in the buffer while playing a current one of said tracks; and
delete one or more tracks in the buffer when a buffer fullness level is reached.

12. The apparatus of claim 11, wherein:
said packetized program segments are broadcast in one data stream at a rate which is greater than a play rate of the programming services.

13. The apparatus of claim 11, wherein:
when the buffer fullness level is reached, the oldest program segment which is stored in the buffer is deleted.

14. The apparatus of claim 11, further comprising:
means for communicating control data with said program segments to provide information regarding the contents of said program segments.

15. The apparatus of claim 11, wherein each of said program segments comprises a separate multimedia track, further comprising:

means for communicating control data with said program segments for use in providing a multimedia clip corresponding to said multimedia track regarding the contents of said track.

16. The apparatus of claim 11, wherein:

each of said program segments comprises one of a separate non-commercial track or a separate commercial track, and a plurality of service tiers are provided, one of said service tiers allowing a user to skip over at least some of the commercial tracks, while another one of said service tiers does not allow a user to skip over the commercial tracks.

17. The apparatus of claim 11, wherein the packetized program segments are communicated in a plurality of data streams, including a first channel of first program segments in a first data stream, and a second channel of second program segments in a second data stream, said apparatus further comprising:

means for providing data which indicates access points for said first and second program segments of said first and second channels to allow a user to skip from a currently playing first track on the first channel to a starting point of a second track in the second channel.

18. The apparatus of claim 11, wherein each of said program segments comprises one of a separate non-commercial track or a separate commercial track, further comprising:

means for communicating at least one of the non-commercial program tracks as replacement programming in a replacement programming bandwidth of the at least one broadcast data stream, such that:

a plurality of service tiers are provided, one of said service tiers allowing a user to recover the non-commercial replacement program tracks, while another one of said service tiers allows a user to recover the commercial tracks in lieu of recovering the non-commercial replacement program tracks.

19. The apparatus of claim 11, wherein:

said overall data rate is adapted to be reduced, at least temporarily, to said play rate.

20. The apparatus of claim 11, further comprising:

means for transmitting segment identifiers with said packetized program segments; wherein, at said decoder:

said segment identifiers are adapted to be stored in memory according to a user command; and said program segments are selectively recovered according to the segment identifiers.

21. An apparatus for receiving broadcast digital programming services each service having a plurality of program segments, said apparatus comprising:

means for receiving said plurality of packetized program segments which are transported in at least one broadcast data stream, each of said program segments defining a separate track of the associated programming service;

said packetized program segments being received at an overall data rate which is greater than a play rate of the programming services;

a buffer for storing at least a portion of the program segments;

means for recovering data which designates access points for said program segments to allow a user to skip forward or backward to a track which is stored in the buffer while playing a current one of said tracks; and means for deleting at least one program segment in the buffer when a buffer fullness level is reached.

22. The apparatus of claim 21, wherein:

said packetized program segments are broadcast in one data stream at a rate which is greater than a play rate of the programming services.

23. The apparatus of claim 21, wherein:

when the buffer fullness level is reached, the oldest track which is stored in the buffer is deleted.

24. The apparatus of claim 21, further comprising:

means for recovering control data with said program segments; and means responsive to said recovering means for providing information regarding the contents of said program segments.

25. The apparatus of claim 21, wherein each of said program segments comprises a separate multimedia track, further comprising:

means for recovering control data with said program segments; and means responsive to said recovering means for providing a multimedia clip corresponding to said multimedia track regarding the contents of said track.

26. The apparatus of claim 21, wherein:

each of said program segments comprises one of a separate non-commercial track or a separate commercial track, and a plurality of service tiers are provided, one of said service tiers allowing a user to skip over at least some of the commercial tracks, while another one of said service tiers does not allow a user to skip over the commercial tracks.

27. The apparatus of claim 21, wherein the packetized program segments are transported in a plurality of data streams, including a first channel of first program segments in a first data stream, and a second channel of second program segments in a second data stream, said apparatus further comprising:

means for recovering data which indicates access points for said first and second program segments of said first and second channels to allow a user to skip from a currently playing first track on the first channel to a starting point of a second track in the second channel.

28. The apparatus of claim 21, wherein each of said program segments comprises one of a separate non-commercial track or a separate commercial track, further comprising:

means for recovering at least one of the non-commercial program tracks as replacement programming in a replacement programming bandwidth of the at least one broadcast data stream, such that:

a plurality of service tiers are provided, one of said service tiers allowing a user to recover the non-commercial replacement program tracks, while another one of said service tiers allows a user to recover the commercial tracks in lieu of recovering the non-commercial replacement program tracks.

29. The apparatus of claim 21, further comprising:

means for pausing a currently played segment according to a user control signal; and means for retaining said currently played segment in said buffer until the user terminates the pausing.

30. The apparatus of claim 21, wherein:
said overall data rate is adapted to be reduced, at least temporarily, to said play rate.

31. The apparatus of claim 21, wherein segment identifiers are transported with said packetized program segments, further comprising:
means for storing said segment identifiers according to a user command; and
means for selectively recovering said program segments according to the segment identifiers.

32. A digital radio receiver, comprising:
a buffer for temporarily storing broadcast digital audio data comprising separate audio tracks which audio data is received via a communication path at a rate which is greater than a play rate thereof; and
a buffer controller for outputting said audio data to audio processing circuitry at said play rate;
wherein said buffer controller is actuable by a user input to provide at least one of a repeat, skip backward, and skip forward function for said separate audio tracks provided by said audio data.

33. The receiver of claim 32, wherein:
said audio tracks are broadcast in one data stream in said communication path at a rate which is greater than the play rate.

34. The receiver of claim 32, wherein:
when a fullness level of the buffer is reached, the oldest audio track which is stored in the buffer is deleted.

35. The receiver of claim 32, further comprising:
means for recovering control data from said communication path with the audio tracks; and
means responsive to said recovering means for providing information regarding the contents of said audio tracks.

36. The receiver of claim 32, wherein program segments each of which comprises separate multimedia tracks are communicated with said audio tracks via said communication path, further comprising:
means for recovering control data from said communication path with said audio tracks; and
means responsive to said recovering means for providing a multimedia clip corresponding to said multimedia track regarding the contents of said audio tracks.

37. The receiver of claim 32, wherein said audio tracks comprise non-commercial tracks and commercial tracks, said receiver further comprising:
means for recovering data from said communication path which indicates access points for said audio tracks to allow a user to skip forward or backward to an audio track which is stored in the buffer while playing a current one of said audio tracks; such that:
a plurality of service tiers are provided, one of said service tiers allowing a user to skip over at least some of the commercial tracks, while another one of said service tiers does not allow a user to skip over the commercial tracks.

38. The receiver of claim 32, wherein the audio tracks are transported in a plurality of data streams, including a first channel of first audio tracks in a first data stream, and a second channel of second audio tracks in a second data stream, said receiver further comprising:
means for providing data which indicates access points for said first and second audio tracks of said first and second channels to allow a user to skip from a currently playing first audio track on the first channel to a starting point of a second audio track in the second channel.

39. The receiver of claim 32, wherein said audio tracks comprise non-commercial tracks and commercial tracks, further comprising:
means for recovering at least one of the non-commercial audio tracks as replacement programming in a replacement programming bandwidth of the at least one broadcast data stream, such that:
a plurality of service tiers are provided, one of said service tiers allowing a user to recover the non-commercial replacement audio tracks, while another one of said service tiers allows a user to recover the commercial tracks in lieu of recovering the non-commercial replacement audio tracks.

40. The receiver of claim 32, further comprising:
means for pausing a currently played track according to a user control signal; and
means for retaining said currently played track in said buffer until the user terminates the pausing.

41. The receiver of claim 32, wherein:
the rate at which the audio data is stored in the buffer is adapted to be reduced, at least temporarily, to said play rate.

42. The receiver of claim 32, wherein segment identifiers are provided with said audio tracks, further comprising:
means for storing said segment identifiers according to a user command; and
means for selectively processing said audio tracks according to the segment identifiers.

* * * * *